United States Patent
Lasser

(10) Patent No.: US 10,447,721 B2
(45) Date of Patent: Oct. 15, 2019

(54) SYSTEMS AND METHODS FOR USING MULTIPLE LATERAL MOVEMENT STRATEGIES IN PENETRATION TESTING

(71) Applicant: XM Ltd., Hertzelia (IL)

(72) Inventor: Menahem Lasser, Kohav-Yair (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

(21) Appl. No.: 15/993,453

(22) Filed: May 30, 2018

(65) Prior Publication Data
US 2019/0081974 A1   Mar. 14, 2019

Related U.S. Application Data

(60) Provisional application No. 62/558,062, filed on Sep. 13, 2017.

(51) Int. Cl.
*H04L 29/06* (2006.01)
*H04L 12/26* (2006.01)

(52) U.S. Cl.
CPC .......... *H04L 63/1433* (2013.01); *H04L 43/50* (2013.01); *H04L 63/20* (2013.01); *H04L 63/1416* (2013.01); *H04L 63/1425* (2013.01)

(58) Field of Classification Search
CPC ..... H04L 63/1433; H04L 63/20; H04L 63/30; H04L 63/1416; H04L 63/1425; H04L 63/1441; H04L 43/50
See application file for complete search history.

(56) References Cited

U.S. PATENT DOCUMENTS

| | | |
|---|---|---|
| 6,918,038 B1 | 7/2005 | Smith et al. |
| 6,952,779 B1 | 10/2005 | Cohen et al. |
| 7,013,395 B1 | 3/2006 | Swiler et al. |
| 7,296,092 B2 | 11/2007 | Nguyen |
| 7,757,293 B2 | 7/2010 | Caceres et al. |
| 8,001,589 B2 | 8/2011 | Ormazabal et al. |
| 8,112,016 B2 | 2/2012 | Matsumoto et al. |
| 8,127,359 B2 | 2/2012 | Kelekar |
| 8,356,353 B2 | 1/2013 | Futoransky et al. |
| 8,365,289 B2 | 1/2013 | Russ et al. |
| 8,490,193 B2 | 7/2013 | Sarraute Yamada et al. |
| 8,650,651 B2 | 2/2014 | Podjarny et al. |
| 8,813,235 B2 | 8/2014 | Sidagni |

(Continued)

FOREIGN PATENT DOCUMENTS

| | | |
|---|---|---|
| CN | 103200230 A | 7/2013 |
| CN | 103916384 A | 7/2014 |

(Continued)

OTHER PUBLICATIONS

CN103200230 Machine Translation (by EPO and Google)—published Jul. 10, 2013; Li Qianmu.

(Continued)

*Primary Examiner* — Tae K Kim

(74) *Attorney, Agent, or Firm* — Marc Van Dyke; Fourth Dimension LLP

(57) ABSTRACT

Methods and systems for carrying out multiple campaigns of penetration testing using different lateral movement strategies for discovering and reporting security vulnerabilities of a networked system, the networked system comprising a plurality of network nodes interconnected by one or more networks.

20 Claims, 11 Drawing Sheets

(56) References Cited

U.S. PATENT DOCUMENTS

| | | | |
|---|---|---|---|
| 9,015,847 B1 | 4/2015 | Kaplan et al. | |
| 9,076,013 B1 | 7/2015 | Bailey, Jr. et al. | |
| 9,183,397 B2 | 11/2015 | Futoransky et al. | |
| 9,224,117 B2 | 12/2015 | Chapman | |
| 9,270,696 B2 | 2/2016 | Fritzson et al. | |
| 9,276,952 B2 | 3/2016 | Simpson et al. | |
| 9,292,695 B1* | 3/2016 | Bassett | G06F 21/577 |
| 9,350,753 B2 | 5/2016 | Kaplan et al. | |
| 9,467,467 B2 | 10/2016 | Alamuri | |
| 9,473,522 B1 | 10/2016 | Kotler et al. | |
| 9,558,355 B2 | 1/2017 | Madou et al. | |
| 9,760,716 B1 | 9/2017 | Mulchandani | |
| 9,800,603 B1 | 10/2017 | Sidagni | |
| 10,038,711 B1 | 7/2018 | Gorodissky et al. | |
| 10,068,095 B1 | 9/2018 | Segal et al. | |
| 10,122,750 B2 | 11/2018 | Gorodissky et al. | |
| 10,257,220 B2 | 4/2019 | Gorodissky | |
| 2005/0086502 A1 | 4/2005 | Rayes et al. | |
| 2005/0102534 A1 | 5/2005 | Wong | |
| 2007/0204347 A1 | 8/2007 | Caceres et al. | |
| 2008/0209567 A1 | 8/2008 | Lockhart et al. | |
| 2008/0256638 A1 | 10/2008 | Russ et al. | |
| 2008/0288822 A1 | 11/2008 | Wu et al. | |
| 2009/0044277 A1 | 2/2009 | Aaron | |
| 2009/0049553 A1 | 2/2009 | Vasudeva | |
| 2009/0172813 A1 | 7/2009 | Aaron | |
| 2010/0138925 A1 | 6/2010 | Barai et al. | |
| 2011/0035803 A1 | 2/2011 | Lucangeli Obes et al. | |
| 2011/0061104 A1* | 3/2011 | Sarraute Yamada | H04L 41/0823 726/23 |
| 2012/0174228 A1 | 7/2012 | Giakouminakis et al. | |
| 2012/0255022 A1 | 10/2012 | Ocepek et al. | |
| 2013/0014263 A1 | 1/2013 | Porcello et al. | |
| 2013/0031635 A1 | 1/2013 | Lotem et al. | |
| 2014/0137257 A1 | 5/2014 | Martinez et al. | |
| 2014/0173739 A1 | 6/2014 | Ahuja et al. | |
| 2014/0237606 A1 | 8/2014 | Futoransky et al. | |
| 2016/0044057 A1* | 2/2016 | Chenette | H04L 63/1433 726/1 |
| 2016/0234251 A1 | 8/2016 | Boice et al. | |
| 2016/0234661 A1 | 8/2016 | Narasimhan et al. | |
| 2016/0248800 A1 | 8/2016 | Ng et al. | |
| 2016/0275289 A1 | 9/2016 | Sethumadhavan et al. | |
| 2016/0342796 A1 | 11/2016 | Kaplan et al. | |
| 2016/0352771 A1* | 12/2016 | Sivan | H04L 63/1433 |
| 2017/0006055 A1* | 1/2017 | Strom | G06F 17/5009 |
| 2017/0013008 A1 | 1/2017 | Carey et al. | |
| 2017/0046519 A1 | 2/2017 | Cam | |
| 2017/0063886 A1 | 3/2017 | Muddu et al. | |
| 2017/0093910 A1* | 3/2017 | Gukal | H04L 63/1416 |
| 2017/0098086 A1 | 4/2017 | Hoernecke et al. | |
| 2017/0104780 A1 | 4/2017 | Zaffarano et al. | |
| 2017/0116421 A1 | 4/2017 | M C et al. | |
| 2017/0279843 A1 | 9/2017 | Schultz et al. | |
| 2017/0289187 A1* | 10/2017 | Noel | H04L 63/1433 |
| 2017/0324768 A1* | 11/2017 | Crabtree | H04L 63/1441 |
| 2017/0373923 A1 | 12/2017 | Kazachkov et al. | |
| 2018/0018465 A1 | 1/2018 | Carey et al. | |
| 2018/0103052 A1* | 4/2018 | Choudhury | G06F 21/566 |
| 2018/0219900 A1 | 8/2018 | Gorodissky et al. | |
| 2018/0219901 A1 | 8/2018 | Gorodissky et al. | |
| 2018/0219903 A1* | 8/2018 | Segal | H04L 63/1433 |
| 2018/0219904 A1 | 8/2018 | Gorodissky et al. | |
| 2018/0219905 A1 | 8/2018 | Gorodissky et al. | |
| 2018/0219909 A1 | 8/2018 | Gorodissky et al. | |
| 2018/0270268 A1 | 9/2018 | Gorodissky et al. | |
| 2018/0316704 A1* | 11/2018 | Joseph Durairaj | H04L 63/1425 |
| 2018/0365429 A1 | 12/2018 | Segal | |
| 2019/0014141 A1 | 1/2019 | Segal et al. | |
| 2019/0036961 A1 | 1/2019 | Gorodissky et al. | |

FOREIGN PATENT DOCUMENTS

| | | |
|---|---|---|
| CN | 104009881 A | 8/2014 |
| EP | 1559008 A1 | 8/2005 |
| WO | 0038036 A2 | 6/2000 |
| WO | 2008054982 A2 | 5/2008 |
| WO | 2010069587 A1 | 6/2010 |
| WO | 2013087982 A1 | 6/2013 |
| WO | 2015111039 A1 | 7/2015 |
| WO | 2016164844 A1 | 10/2016 |
| WO | 2018156394 A1 | 8/2018 |

OTHER PUBLICATIONS

Authors: Alhomidi and Reed Title: Attack Graph-Based Risk Assessment and Optimisation Approach International Journal of Network Security & Its Applications (IJNSA), vol. 6, No. 3, May 2014.

CN103916384 Machine Translation (by EPO and Google)—published Jul. 9, 2014 Zhong Li.

CN104009881 Machine Translation (by EPO and Google)—published Aug. 27, 2014 Wang Tian.

* cited by examiner

Frame 1 at time = t1

Frame 2 at time = t2

Frame 3 at time = t3

Frame 1 at time = *t1*

550

Selected Lateral Movement Strategies

- ■ Breadth First Search (BFS)
- ■ Depth First Search (DFS)
- ■ Shortest distance to specific resource
- ☐ Alphabetical order of node name

552

Frame 2 at time = *t2*

550

Selected Lateral Movement Strategies

- ■ Breadth First Search (BFS)
- ■ Depth First Search (DFS)
- ☐ Shortest distance to specific resource
- ■ Alphabetical order of node name

552

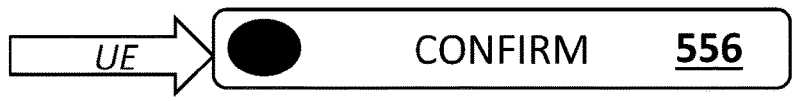

Figure 8

SYSTEMS AND METHODS FOR USING MULTIPLE LATERAL MOVEMENT STRATEGIES IN PENETRATION TESTING

RELATED APPLICATIONS

The present application gains priority from U.S. Provisional Patent Application 62/558,062 filed on Sep. 13, 2017, and entitled "Using Multiple Strategies in a Penetration Testing Campaign".

BACKGROUND OF THE INVENTION

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization, or even of only a portion of it, might cause significant damage, up to completely shutting down all operations. Additionally, much of the data of the organization, if not all the data, exist somewhere on its networked computing system, including all confidential data comprising the "crown jewels" of the organization, such as prices, details of customers, purchase orders, employees' salaries, technical formulas, etc. Loss of such data or leaks of such data to unauthorized external entities might be disastrous for the organization.

Many organizational networks are connected to the Internet at least through one network node, and consequently may be subject to attacks by computer hackers or by hostile adversaries. Quite often the newspapers report incidents in which websites crashed, sensitive data was stolen, or service to customers was denied, where the failures were the results of hostile penetration into an organization's networked computing system.

Thus, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISOs (Computer Information Security Officers) will admit (maybe only off the record), that they don't really know how well they can withstand an attack from a given adversary. The only way to really know the strength and security of a system, is by trying to attack it as a real adversary would. This is known as red-teaming or penetration testing (pen testing, in short), and is a very common approach that is even required by regulation in some developed countries.

Penetration testing requires highly talented people to man the testing team. Those people should be familiar with each and every publicly known vulnerability and attacking method and should also have a very good familiarity with networking techniques and multiple operating systems implementations. Such people are hard to find and therefore many organizations give up establishing their own penetration testing teams and resort to hiring external expert consultants for carrying out that role (or completely give up penetration testing). However, external consultants are expensive and therefore are typically called in only for brief periods separated by long intervals in which no penetration testing is carried out. This makes the penetration testing ineffective, as vulnerabilities caused by new attacks, that appear almost daily, are discovered only months after becoming serious threats to the organization.

Additionally, even rich organizations that can afford hiring talented experts for in-house penetration testing teams do not achieve good protection. Testing for vulnerabilities of a large network containing many types of computers, operating systems, network routers and other devices is both a very complex and a very tedious process. The process is prone to human errors such as missing testing for certain threats or misinterpreting the damages of certain attacks. Additionally, because a process of full testing against all threats is quite long, the organization might again end with a too long discovery period after a new threat appears.

In view of the above deficiencies, automated penetration testing solutions were introduced in recent years by several vendors. These automated solutions reduce human involvement in the penetration testing process, or at least in some of its functions.

A penetration testing process involves at least the following main functions: (i) a reconnaissance function, (ii) an attack function, and (iii) a reporting function. The process may also include additional functions, for example a cleanup function that restores the tested networked system to its original state as it was before the test. In an automated penetration testing system, at least one of the above three functions is at least partially automated, and typically two or three of them are at least partially automated.

A reconnaissance function is the function within a penetration testing system that handles the collection of data about the tested networked system. The collected data may include internal data of networks nodes, data about network traffic within the tested networked system, business intelligence data of the organization owning the tested networked system, etc. The functionality of a prior art reconnaissance function can be implemented, for example, by software executing in a server that is not one of the network nodes of the tested networked system, where the server probes the tested networked system for the purpose of collecting data about it.

An attack function is the function within a penetration testing system that handles the determination of whether security vulnerabilities exist in the tested networked system based on data collected by the reconnaissance function. The functionality of a prior art attack function can be implemented, for example, by software executing in a server that is not one of the nodes of the tested networked system, where the server attempts to attack the tested networked system for the purpose of verifying that it can be compromised.

A reporting function is the function within a penetration testing system that handles the reporting of results of the penetration testing system. The functionality of a prior art reporting function may be implemented, for example, by software executing in the same server that executes the functionality of the attack function, where the server reports the findings of the attack function to an administrator or a CISO of the tested networked system.

FIG. 1A (PRIOR ART) is a block diagram of code modules of a typical penetration testing system. FIG. 1B (PRIOR ART) is a related flow-chart.

In FIG. 1A, code for the reconnaissance function, for the attack function, and for the reporting function are respectively labelled as 20, 30 and 40, and are each schematically illustrated as part of a penetration testing system code module (PTSCM) labelled as 10. The term 'code' is intended broadly and may include any combination of computer-executable code and computer-readable data which when read affects the output of execution of the code. The computer-executable code may be provided as any combination of human-readable code (e.g. in a scripting language such as Python), machine language code, assembler code and byte code, or in any form known in the art. Furthermore, the executable code may include any stored data (e.g. structured data) such as configuration files, XML files, and data residing in any type of database (e.g. a relational database, an object-database, etc.).

In one example and as shown in FIG. 1B, the reconnaissance function (performed in step S21 by execution of reconnaissance function code 20), the attack function (performed in step S31 by execution of attack function code 30) and the reporting function (performed in step S41 by execution of reporting function code 40) are executed in strictly sequential order so that first the reconnaissance function is performed by executing code 20 thereof, then the attack function is performed by executing code 30 thereof, and finally the reporting function is performed 40 by executing code thereof.

However, the skilled artisan will appreciate that this order is just one example, and is not a requirement. For example, the attack and the reporting functions may be performed in parallel or in an interleaved way, with the reporting function reporting first results obtained by the attack function, while the attack function is working on additional results.

Similarly, the reconnaissance and the attack functions may operate in parallel or in an interleaved way, with the attack function detecting a vulnerability based on first data collected by the reconnaissance function, while the reconnaissance function is working on collecting additional data.

FIG. 1A also illustrates code of an optional cleanup function which is labeled as 50. Also illustrated in FIG. 1B is step S51 of performing a cleanup function—e.g. by cleanup function code 50 of FIG. 1A.

"A campaign of penetration testing" is a specific run of a specific test of a specific networked system by the penetration testing system.

A penetration-testing-campaign module may comprise at least part of reconnaissance function code 20, attack function code 30 and optionally cleanup function code 50—for example, in combination with suitable hardware (e.g. one or more computing device(s) 110 and one or more processor(s) 120 thereof, see FIG. 2) for executing the code.

FIG. 2 illustrates a prior art computing device 110 which may have any form-factor including but not limited to a laptop, a desktop, a mobile phone, a server, a tablet, or any other form factor. The computing device 110 in FIG. 2 includes (i) computer memory 160 which may store code 180; (ii) one or more processors 120 (e.g. central-processing-unit (CPU)) for executing code 180; (iii) one or more human-interface device(s) 140 (e.g. mouse, keyboard, touchscreen, gesture-detecting apparatus including a camera, etc.) or an interface (e.g. USB interface) to receive input from a human-interface device; (iv) a display device 130 (e.g. computer screen) or an interface (e.g. HDMI interface, USB interface) for exporting video to a display device and (v) a network interface 150 (e.g. a network card, or a wireless modem).

Memory 160 may include any combination of volatile (e.g. RAM) and non-volatile (e.g. ROM, flash, disk-drive) memory. Code 180 may include operating-system code—e.g. Windows®, Linux®, Android®, Mac-OS®.

Computing device 110 may include a user-interface for receiving input from a user (e.g. manual input, visual input, audio input, or input in any other form) and for visually displaying output. The user-interface (e.g. graphical user interface (GUI)) of computing device 110 may thus include the combination of HID device 140 or an interface thereof (i.e. in communication with an external HID device 140), display device 130 or an interface thereof (i.e. in communication with an external display device), and user-interface (UI) code stored in memory 160 and executed by one or more processor(s) 120. The user-interface may include one or more GUI widgets such as labels, buttons (e.g. radio buttons or check boxes), sliders, spinners, icons, windows, panels, text boxes, and the like.

In one example, a penetration testing system is the combination of (i) code 10 (e.g. including reconnaissance function code 20, attack function code 30, reporting function code 40, and optionally cleaning function code 50); and (ii) one or more computing devices 110 which execute the code 10. For example, a first computing device may execute a first portion of code 10 and a second computing device (e.g. in networked communication with the first computing device) may execute a second portion of code 10.

Penetration testing systems may employ different types of architectures, each having its advantages and disadvantages. Examples are actual attack penetration testing systems, simulated penetration testing systems and reconnaissance agent penetration testing systems. See the Definitions section for more details about these types of penetration testing systems.

The Problem to Solve

When a user desires to operate a prior art penetration testing system for running a test on a specific networked system, the penetration testing system must know what test it should execute. For example, the penetration testing system must know what is the type of attacker against whom the test is making its assessment (a state-sponsored actor, a cyber-criminal etc.) and what are his capabilities. As another example, the penetration testing system must know what is the goal of the attacker according to which the attack will be judged as a success or a failure (copying a specific file and exporting it out of the tested networked system, encoding a specific directory of a specific network node for ransom, etc.).

A specific run of a specific test of a specific networked system by a penetration testing system is called a "campaign" of that penetration testing system, as defined hereinbelow in definition 18 of the 'Definitions' section. A collection of values for all information items a penetration testing system must know before executing a campaign is called "specifications of the campaign" or "scenario", as defined hereinbelow in definition 23 of the 'Definitions' section. For example, the type of the attacker and the goal of the attacker are specific information items of a campaign, and specific values for them are parts of the specifications of any campaign.

One special information item of a campaign is the lateral movement strategy of the attacker during the campaign.

The lateral movement strategy of an attacker is the decision logic applied by the attacker of a campaign for selecting the next network node to try to compromise. During a penetration testing campaign, the attacker is assumed to make progress by an iterative process, wherein in each iteration the attacker selects the next node to attack, based on the group of network nodes that are already compromised and controlled by the attacker. If the attack on the selected node is successful, that node is added to the group of nodes that are already compromised, and another iteration begins. If the attempt to compromise the selected node fails, another node is selected, either according to some other rule or randomly.

All types of penetration testing systems, whether using simulated penetration testing, actual attack penetration testing or some other form of penetration testing, must use a lateral movement strategy. In penetration testing systems that actually attack the tested networked system, the lateral movement strategy selects the path of attack actually taken through the networked system. In penetration testing systems that simulate or evaluate the results of attacking the tested networked system, the lateral movement strategy selects the path of attack taken in the simulation or the evaluation through the networked system. Therefore, in the above explanation, the term "attack" should be understood to mean "actual attack or simulated attack", the term "already controls" should be understood to mean "already controls or already determined to be able to control", the term "already compromised" should be understood to mean "already compromised or already determined to be comprisable", etc.

A simple example of a lateral movement strategy is a "depth first" strategy, in which the next network node to attempt to compromise is a network node that is not yet compromised and is an immediate neighbor of the last network node that was compromised, provided such neighbor node exists. Two network nodes are "immediate neighbors" of each other if and only if they have a direct communication link between them that does not pass through any other network node.

Another simple example is a "breadth search" strategy, in which the next network node to attempt to compromise is a network node that is not yet compromised and whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case, the next network node to try to compromise may be selected by determining the shortest path in the networked system leading from an already compromised node to the specific node containing the desired resource, and selecting the first node on the determined path to be the next node to attempt to compromise. If the shortest path has a length of one, which occurs when the specific node is an immediate neighbor of an already compromised node, then the next node to attempt to compromise is the specific node containing the desired resource.

Another example of a lateral movement strategy is a strategy that gives priority to network nodes satisfying a specific condition, for example nodes that are known to have a specific weakness, such as running the Windows XP operating system. In such case, the next node to attempt to compromise is a node that satisfies the condition and is also an immediate neighbor of an already compromised node, if such node exists.

In prior art penetration testing systems, an attacker can only have a single lateral movement strategy, which may be (i) selected by the designer of the penetration testing system and cannot be changed at all, (ii) selected by the penetration testing system at runtime, for example according to the type of attacker selected for the current campaign, and cannot be changed by the user, or (iii) selected by the user, when configuring the campaign.

The lateral movement strategy used during a campaign may impact the results of the campaign. At a given decision point, a first strategy may lead to picking one network node to be the next node to attack, while a second strategy may lead to picking another network node to be the next node to attack. This distinction may then create a broader and broader difference between running the campaign using the first strategy and running it using the second strategy. If the key to conquering the tested networked system is the compromising of a specific administrator node, one strategy may be "lucky" and attack that specific node early in the campaign, while the other strategy may be "unlucky" and waste a lot of time attempting to break into many unimportant nodes before finally reaching the specific administrator node. Thus, the choice of strategy might significantly affect the length of time required for the penetration testing system to compromise the specific node and/or the tested network.

While the previous example demonstrates a difference in execution time, in this example both strategies eventually produce the same result. However, this is not always the case. Real-world organizations may have thousands and even tens of thousands of network nodes. Exhaustively testing such huge network until each node is compromised and controlled by the attacker is practically impossible because of the amount of time this might require. Therefore, penetration testing campaigns are typically provided with a time limit for their execution, which may be an hour or a day, or some other time value of a similar magnitude.

If a time-limited campaign is executed with each of the two strategies described above, the outcome might be such that with one strategy the result of the test is a successful compromising of the tested network, while with the other strategy the result is a failure in compromising the network because of aborting the test when hitting the time limit. In the latter case, the results presented to the operator of the penetration testing system will be misleading—the report will say the penetration attempt failed and the system is safe, while in reality this is not the case.

This situation is clearly undesirable and should be remedied.

SUMMARY OF THE INVENTION

Some embodiments of the invention relate to methods and systems for carrying out automated penetration testing, in which a plurality of similar penetration testing campaigns are executed, each of the penetration testing campaigns using a different lateral movement strategy.

According to an aspect of an embodiment of the invention, there is provided a method of penetration testing of a networked system by a penetration testing system that is controlled by a user interface of a computing device, the method including:

a. selecting a plurality of lateral movement strategies from a group of two or more lateral movement strategies that are available to be used in penetration testing campaigns;

b. executing, by the penetration testing system, a plurality of penetration testing campaigns, wherein (i) the number of penetration testing campaigns in the plurality of penetration testing campaigns is equal to the number of lateral movement strategies in the selected plurality of lateral movement strategies, (ii) for each specific lateral movement strategy in the selected plurality of lateral movement strategies there is a corresponding penetration testing campaign in the plurality of penetration testing campaigns that uses the specific lateral movement strategy as the lateral movement strategy of the attacker of the corresponding penetration testing campaign, and (iii) for any two penetration testing campaigns in the plurality of penetration testing campaigns and for any specific information item of penetration testing campaigns other than lateral movement strategy, values of the specific information item in the two penetration testing campaigns are equal; and c. reporting, by the penetration testing system, at least one security vulnerability determined to exist in the networked system by the executing of the plurality of penetration testing campaigns, wherein the reporting includes at least one of (i) causing a display device to display a report including information about the at least one security vulnerability, (ii) storing the report including information about the at least one security vulnerability in a file, and (iii) electronically transmitting the report including information about the at least one security vulnerability.

In some embodiments, the selecting of the plurality of lateral movement strategies includes selecting all of the lateral movement strategies in the group of two or more lateral movement strategies to be the selected plurality of lateral movement strategies.

In some embodiments, the selecting of the plurality of lateral movement strategies includes selecting only some of the lateral movement strategies in the group of two or more lateral movement strategies to be the selected plurality of lateral movement strategies.

In some embodiments, the selecting of the plurality of lateral movement strategies includes automatically selecting the plurality of lateral movement strategies from the group of two or more lateral movement strategies, by the penetration testing system. In some embodiments, the automatically selecting of the plurality of lateral movement strategies is based on a value of an information item of the plurality of penetration testing campaigns. In other embodiments, the automatically selecting of the plurality of lateral movement strategies is a random selection.

In some embodiments, the selecting of the plurality of lateral movement strategies includes receiving, by the penetration testing system and via the user interface of the computing device, one or more manually-entered inputs, the one or more manually-entered inputs selecting the plurality of lateral movement strategies from the group of two or more lateral movement strategies.

In some embodiments, a number of lateral movement strategies in the selected plurality of lateral movement strategies is pre-defined by a vendor of the penetration testing system.

In some embodiments, a number of lateral movement strategies in the selected plurality of lateral movement strategies depends on a value of an information item of the plurality of penetration testing campaigns.

In some embodiments, the selecting of the plurality of lateral movement strategies includes receiving, by the penetration testing system and via the user interface of the computing device, one or more manually-entered inputs, the one or more manually-entered inputs defining a number of lateral movement strategies in the selected plurality of lateral movement strategies.

In some embodiments, the method further includes:

d. receiving, by the penetration testing system and via the user interface of the computing device, one or more manually-entered inputs, the one or more manually-entered inputs instructing the penetration testing system to enter a mode in which the selecting of the plurality of lateral movement strategies is enabled.

In some embodiments, the group of two or more lateral movement strategies that are available to be used in penetration testing campaigns is pre-defined by a vendor of the penetration testing system.

In some embodiments, the method further includes, prior to the selecting, determining, by the penetration testing system, the group of two or more lateral movement strategies that are available to be used in penetration testing campaigns.

In some embodiments, the determining of the group of two or more lateral movement strategies that are available to be used in penetration testing campaigns includes receiving, by the penetration testing system and via the user interface of the computing device, one or more manually-entered inputs, the one or more manually-entered inputs determining the group of two or more lateral movement strategies that are available to be used in penetration testing campaigns.

In some embodiments, the determining of the group of two or more lateral movement strategies that are available to be used in penetration testing campaigns is based on a value of an information item of the plurality of penetration testing campaigns.

In some embodiments, the executing of the plurality of penetration testing campaigns includes executing at least two penetration testing campaigns of the plurality of penetration testing campaigns in parallel. In some such embodiments, the at least two penetration testing campaigns of the plurality of penetration testing campaigns use simulated penetration testing or reconnaissance agent penetration testing.

In some embodiments, the executing of the plurality of penetration testing campaigns includes executing at least two penetration testing campaigns of the plurality of penetration testing campaigns in series. In some such embodiments, the at least two penetration testing campaigns of the plurality of penetration testing campaigns use actual attack penetration testing.

In some embodiments, the at least two penetration testing campaigns executed in series are executed according to an order of the corresponding lateral movement strategies, wherein the order of the lateral movement strategies is pre-defined by a vendor of the penetration testing system. In other embodiments, the at least two penetration testing campaigns executed in series are executed according to a random order determined at the time of the executing.

In some embodiments, for each given lateral movement strategy in the selected plurality of lateral movement strategies, there is at least one event during the executing of the corresponding penetration testing campaign, in which a network node of the networked system is selected to be the next network node to be attacked by the attacker of the corresponding penetration testing campaign according to the given lateral movement strategy.

In some embodiments, the executing the plurality of penetration testing campaigns includes assigning a corresponding time limit to each penetration testing campaign of the plurality of penetration testing campaigns, wherein execution time of each penetration testing campaign of the plurality of penetration testing campaigns is limited by the corresponding time limit.

In some embodiments, the plurality of penetration testing campaigns includes a first penetration testing campaign and a second penetration testing campaign, wherein the time limit assigned to the first penetration testing campaign is different from the time limit assigned to the second penetration testing campaign. In other embodiments, the time limits assigned to all of the penetration testing campaigns in the plurality of penetration testing campaigns are the same.

In some embodiments, the executing of the plurality of penetration testing campaigns includes executing each of the plurality of penetration testing campaigns to completion.

In some embodiments, the executing of the plurality of penetration testing campaigns includes: in response to determining, by one penetration testing campaign of the plurality of penetration testing campaigns, that at least one security vulnerability exists in the networked system, (i) aborting all penetration testing campaigns of the plurality of penetration testing campaigns that are running at the time of the determining, and (ii) cancelling execution of all penetration testing campaigns of the plurality of penetration testing campaigns scheduled to be executed that have not yet started execution.

According to an aspect of an embodiment of the invention, there is provided a penetration testing system for penetration testing of a networked system, the penetration testing system including:
1. a set-up module including:
   i. one or more set-up processors; and
   ii. a set-up non-transitory computer readable storage medium for instructions execution by the one or more set-up processors, the set-up non-transitory computer readable storage medium having stored instructions to select a plurality of lateral movement strategies from a group of two or more lateral movement strategies that are available to be used in penetration testing campaigns;
2. a penetration-testing-campaign module including:
   i. one or more penetration-testing-campaign processors; and
   ii. a penetration-testing-campaign non-transitory computer readable storage medium for instructions execution by the one or more penetration-testing-campaign processors, the penetration-testing-campaign non-transitory computer readable storage medium having stored instructions to execute a plurality of penetration testing campaigns, wherein (i) the number of penetration testing campaigns in the plurality of penetration testing campaigns is equal to the number of lateral movement strategies in the selected plurality of lateral movement strategies, (ii) for each specific lateral movement strategy in the selected plurality of lateral movement strategies there is a corresponding penetration testing campaign in the plurality of penetration testing campaigns that uses the specific lateral movement strategy as the lateral movement strategy of the attacker of the corresponding penetration testing campaign, and (iii) for any two penetration testing campaigns in the plurality of penetration testing campaigns and for any specific information item of penetration testing campaigns other than lateral movement strategy, values of the specific information item in the two penetration testing campaigns are equal; and
3. a reporting module, including:
   i. one or more reporting processors; and
   ii. a reporting non-transitory computer readable storage medium for instructions execution by the one or more reporting processors, the reporting non-transitory computer readable storage medium having stored instructions to report at least one security vulnerability determined to exist in the networked system according to results of the plurality of penetration testing campaigns executed by the penetration testing campaign module, the instructions to report including at least one of (i) instructions to cause a display device to display a report including information about the at least one security vulnerability, (ii) instructions to store the report including information about the at least one security vulnerability in a file, and (iii) instructions to electronically transmit the report including information about the at least one security vulnerability.

In some embodiments, the instructions to select the plurality of lateral movement strategies include instructions to select all of the lateral movement strategies in the group of two or more lateral movement strategies to be the selected plurality of lateral movement strategies.

In some embodiments, the instructions to select the plurality of lateral movement strategies include instructions to select only some of the lateral movement strategies in the group of two or more lateral movement strategies to be the selected plurality of lateral movement strategies.

In some embodiments, the instructions to select the plurality of lateral movement strategies include instructions to automatically select the plurality of lateral movement strategies from the group of two or more lateral movement strategies, by the penetration testing system. In some embodiments, the instructions to automatically select the plurality of lateral movement strategies include instructions to automatically select the plurality of lateral movement strategies based on a value of an information item of the plurality of penetration testing campaigns. In other embodiments, the instructions to automatically select the plurality of lateral movement strategies include instructions to automatically select the plurality of lateral movement strategies by random selection.

In some embodiments, the instructions to select the plurality of lateral movement strategies include instructions to receive, via a user interface of a computing device, one or more manually-entered inputs, the one or more manually-entered inputs selecting the plurality of lateral movement strategies from the group of two or more lateral movement strategies.

In some embodiments, a number of lateral movement strategies to be selected by the instructions to select the plurality of lateral movement strategies is pre-defined by a vendor of the penetration testing system.

In some embodiments, a number of lateral movement strategies to be selected by the instructions to select the plurality of lateral movement strategies depends on a value of an information item of the plurality of penetration testing campaigns.

In some embodiments, the instructions to select the plurality of lateral movement strategies includes instructions to receive, via a user interface of a computing device, one or more manually-entered inputs, the one or more manually-entered inputs defining a number of lateral movement strategies in the selected plurality of lateral movement strategies.

In some embodiments, the set-up non-transitory computer readable storage medium further having stored instructions to receive, via a user interface of a computing device, one or more manually-entered inputs, the one or more manually-entered inputs instructing the penetration testing system to enter a mode in which the selecting of the plurality of lateral movement strategies is enabled.

In some embodiments, the group of two or more lateral movement strategies that are available to be used in penetration testing campaigns is pre-defined by a vendor of the penetration testing system.

In some embodiments, the set-up non-transitory computer readable storage medium further having stored instructions, to be carried out before carrying out the instructions to select, to determine the group of two or more lateral movement strategies that are available to be used in penetration testing campaigns.

In some embodiments, the instructions to determine the group of two or more lateral movement strategies that are available to be used in penetration testing campaigns include instructions to receive, via a user interface of a computing device, one or more manually-entered inputs, the one or more manually-entered inputs determining the group of two or more lateral movement strategies that are available to be used in penetration testing campaigns.

In some embodiments, the instructions to determine the group of two or more lateral movement strategies that are available to be used in penetration testing campaigns include instructions to determine the group of two or more lateral movement strategies based on a value of an information item of the plurality of penetration testing campaigns.

In some embodiments, the instructions to execute the plurality of penetration testing campaigns include instructions to execute at least two penetration testing campaigns of the plurality of penetration testing campaigns in parallel. In some such embodiments, the at least two penetration testing campaigns of the plurality of penetration testing campaigns use simulated penetration testing or reconnaissance agent penetration testing.

In some embodiments, the instructions to execute the plurality of penetration testing campaigns include instructions to execute at least two penetration testing campaigns of the plurality of penetration testing campaigns in series. In some such embodiments, the at least two penetration testing campaigns of the plurality of penetration testing campaigns use actual attack penetration testing.

In some embodiments, the instructions to execute the at least two penetration testing campaigns in series include instructions to execute the at least two penetration testing campaigns according to an order of the corresponding lateral movement strategies, wherein the order of the lateral movement strategies is pre-defined by a vendor of the penetration testing system. In other embodiments, the instructions to execute the at least two penetration testing campaigns in series include instructions to execute the at least two penetration testing campaigns according to a random order determined at the time of the executing.

In some embodiments, the instructions to execute the plurality of penetration testing campaigns include instructions to assign a corresponding time limit to each penetration testing campaign of the plurality of penetration testing campaigns, and wherein, in the instructions to execute, execution time of each penetration testing campaign of the plurality of penetration testing campaigns is limited by the corresponding time limit.

In some embodiments, the plurality of penetration testing campaigns includes a first penetration testing campaign and a second penetration testing campaign, wherein the instructions to assign the corresponding time limit include instructions to assign different time limits to the first penetration testing campaign and to the second penetration testing campaign.

In some embodiments, the instructions to assign the corresponding time limit include instructions to assign the same time limit to all of the penetration testing campaigns in the plurality of penetration testing campaigns.

In some embodiments, the instructions to execute the plurality of penetration testing campaigns include instructions to execute each of the plurality of penetration testing campaigns to completion. In other embodiments, the instructions to execute the plurality of penetration testing campaigns include instructions, to be carried out in response to determining, by one penetration testing campaign of the plurality of penetration testing campaigns, that at least one security vulnerability exists in the networked system, to: (i) abort all penetration testing campaigns of the plurality of penetration testing campaigns that are running at the time of the determining, and (ii) cancel execution of all penetration testing campaigns of the plurality of penetration testing campaigns scheduled to be executed that have not yet started execution.

Unless otherwise defined, all technical and scientific terms used herein have the same meaning as commonly understood by one of ordinary skill in the art to which the invention pertains, unless explicitly defined in this application. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIG. 8 illustrates a fourth example of user engagements of a user interface according to a fifth embodiment of the invention.

DESCRIPTION OF SOME EMBODIMENTS OF THE INVENTION

Figure 1A:
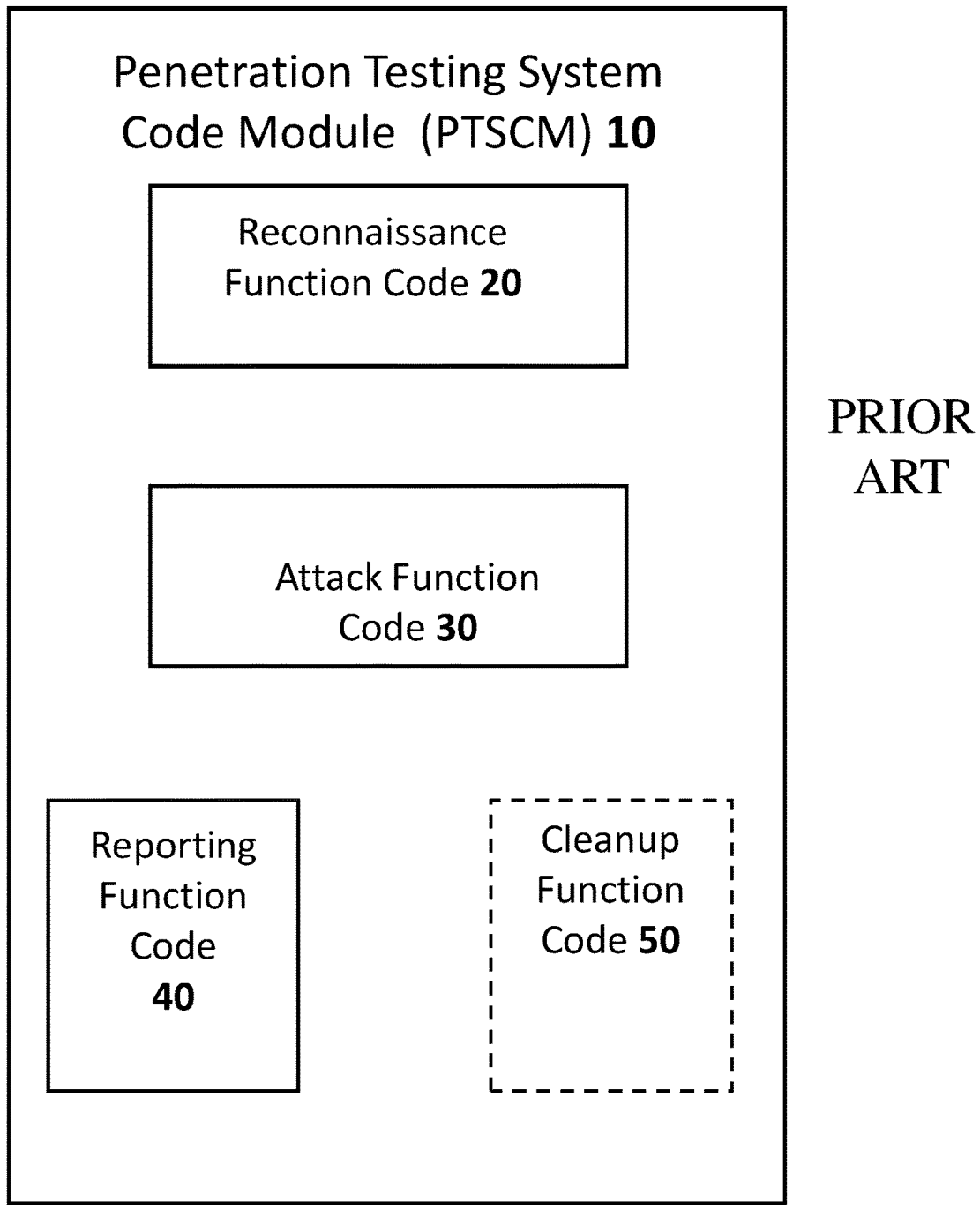
FIG. 1A (PRIOR ART) is a block diagram of code modules of a typical penetration testing system.
Figure 1B:
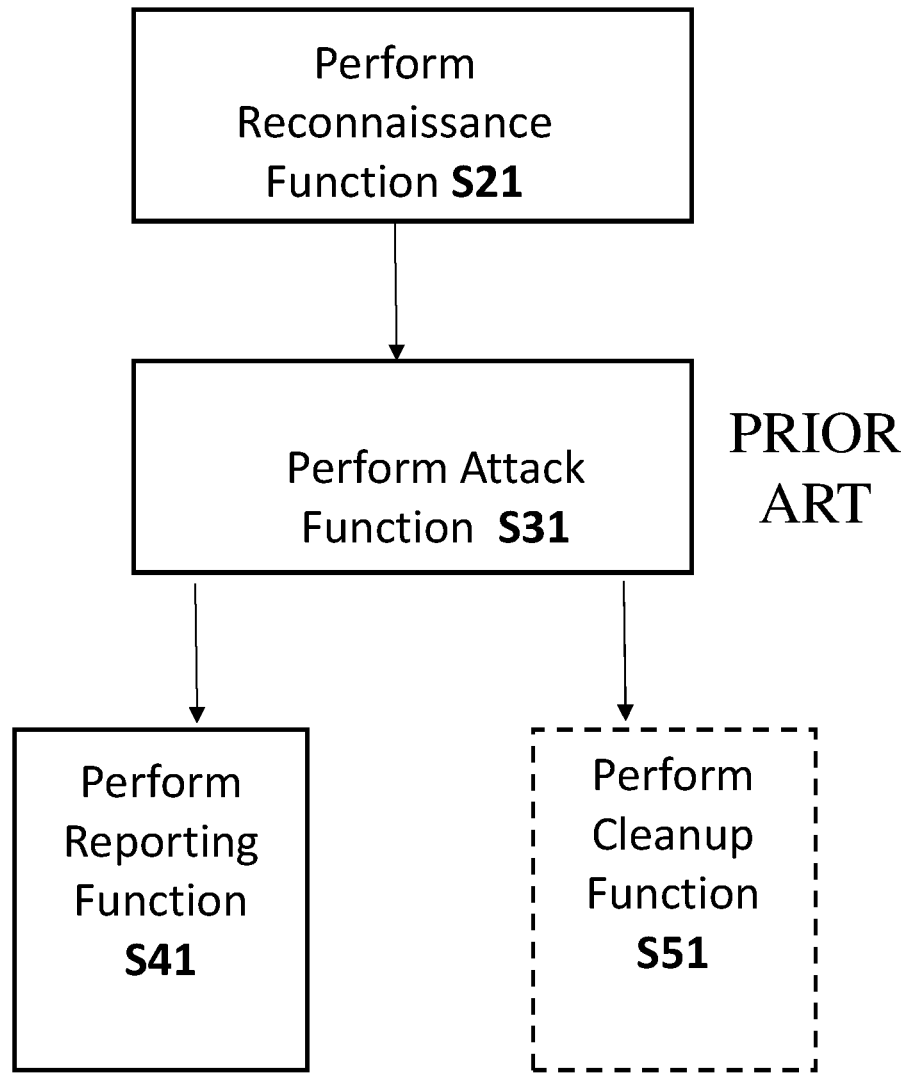
FIG. 1B (PRIOR ART) is a flow-chart related to the system of FIG. 1A.
Figure 2:
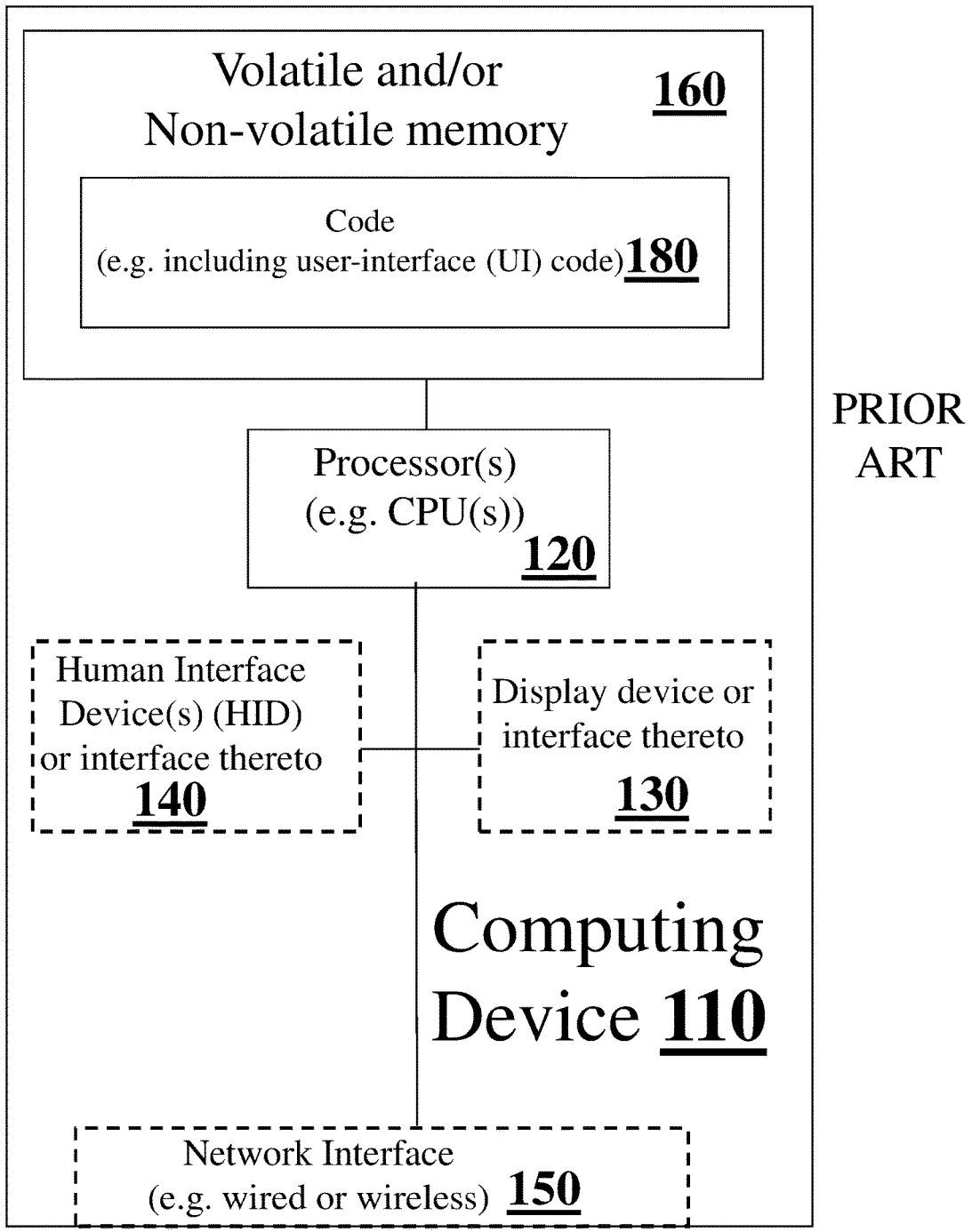
FIG. 2 (PRIOR ART) illustrates a prior art computing device.

The invention, in some embodiments, relates to penetration testing of a networked system, and specifically penetration testing which includes executing of a plurality of penetration testing campaigns each using a different lateral movement strategy.

The present disclosure should be interpreted according to the definitions in the "Definitions Section" at the end of the specification. In case of a contradiction between the definitions in the "Definitions Section" at the end of the specification and other sections of this disclosure, the "Definitions Section" at the end of the specification section should prevail.

In case of a contradiction between the "Definitions Section" at the end of the specification and a definition or a description in any other document, including in another document incorporated in this disclosure by reference, the "Definitions Section" at the end of the specification should prevail, even if the definition or the description in the other document is commonly accepted by a person of ordinary skill in the art.

The present invention provides a solution to the challenges discussed hereinabove with respect to the prior art, and specifically provides a penetration testing system that, when instructed to execute a campaign, executes multiple campaigns that are almost the same and differ only in the lateral movement strategies of their attackers.

The value of the lateral movement strategy of the attacker of a campaign is a value of one of the information items of the campaign. Therefore, two campaigns that have identical values for each and every one of their information items except the lateral movement strategies of their attackers are, formally speaking, not "the same campaign". For the purpose of this disclosure, two campaigns are considered to be "almost the same" when they have the same values for all the information items characterizing the two campaigns, except for the values of the lateral movement strategies of their attackers.

In a first embodiment of the invention, the penetration testing system automatically selects multiple lateral movement strategies to be used, before starting execution of a campaign, without the user having any influence on the selection of strategies. The lateral movement strategies are selected from a list of pre-defined available strategies. For example, the system may select the two strategies "BFS" and "DFS" from a list of strategies including these two strategies. When instructed to run a campaign, the penetration testing system automatically executes multiple campaigns, differing only in their lateral movement strategy, thus being almost the same campaigns. Each campaign of the multiple campaigns uses a different strategy from the list of selected strategies. In the above example, there will be two campaigns, one having a strategy of "BFS", and the other having a strategy of "DFS".

The multiple strategies selected for use may be all the strategies in the pre-defined list of available strategies. In such a case, all the strategies available for use in the penetration testing system are in fact used in testing the tested networked system. In other words, the number of campaigns that are executed following the user's request for a single campaign, is equal to the number of available strategies. Alternatively, the multiple strategies selected for use may be a proper subset of the pre-defined list of available strategies. In such case the system may automatically select strategies based on values of one or more information items of the campaign other than the lateral movement strategy, in a similar manner to that described in U.S. application Ser. No. 15/681,782, which is incorporated by reference as though fully set forth herein, or based on a random selection in a similar manner to that described in U.S. application Ser. No. 15/869,128, which is incorporated by reference as though fully set forth herein. For example, certain strategies may be preferred when the goal of the attacker is "export as many files out of the networked system", while other strategies may be preferred when the goal of the attacker is "export a given file from a given network node".

In the first embodiment, the number of strategies to be used is automatically determined by the system. It may be a pre-defined number, for example defined by the designer of the penetration testing system, or it may be selected by the penetration testing system based on values of one or more other information items of the campaign.

In some embodiments, the multiple campaigns may be executed by the penetration testing system in parallel. In such case, the multiple campaigns make progress side-by-side. This may be implemented, for example, by having multiple threads, multiple processes, or multiple virtual machines within the penetration testing system each execute one campaign using one of the multiple selected strategies.

In some embodiments, all campaigns may run to completion, be it failure to make additional progress or success in achieving the goal of the attacker of the campaign. In other embodiments, when one of the multiple campaigns succeeds in achieving the goal, which is common to all running campaigns, all other campaigns which are currently running are aborted, and any campaigns scheduled to run are cancelled, as it has already been determined that the system can be compromised. Alternatively or additionally, each of the multiple campaigns may be assigned a time limit, after which it is aborted if not yet successful in achieving the goal. The time limit of a campaign may depend on the lateral movement strategy assigned to the campaign and thus be different for different campaigns, or may be the same time limit for all the multiple campaigns.

Running campaigns in parallel is always possible when the penetration testing system validates its findings about potential security vulnerabilities by simulating or otherwise evaluating the vulnerability. In such a penetration testing system, each of the multiple campaigns executes in its own thread, process, or virtual machine, and no interference occurs between campaigns, even though they apply to the same tested networked system. However, in a penetration testing system that validates its findings about potential security vulnerabilities by actually attempting to attack the tested networked system, it is possible that two campaigns running in parallel might attempt to change a state or a setting of a network node in an incompatible way, thus interfering with each other.

As such, when such interference is a possibility, and taking into account the type of penetration testing system, the tested networked system, and the information items specified for the campaigns, serial execution may be preferable to parallel execution of the campaigns. Serial execution has the additional advantage of not requiring multi-processing and/or multiple virtual machines in the penetration testing system.

When executing the multiple campaigns serially, the system puts the selected strategies in an ordered list, and executes campaigns with each of the selected strategies according to that order. The ordering of strategies may be fixed, for example pre-defined by a vendor of the system, or may be randomly decided for each case. The execution of each campaign may be limited by a corresponding time-limit, so that a strategy that fails to terminate quickly shall not consume too much time. Optionally, when a campaign succeeds in achieving its goal, the test is terminated, and running of additional campaigns is cancelled, as it is already determined that the system can be compromised.

Regardless of whether the multiple campaigns are executed in parallel or in series, in view of the execution of multiple almost-the-same campaigns with different strategies, it is highly unlikely that a damaging vulnerability in some network node will escape detection. This is in contrast with prior art penetration testing systems, that when instructed by their users to execute a campaign always use the same strategy. Therefore, if they happen to miss a certain vulnerability in a first run, they are likely to also miss it on any repeated run of that campaign.

In a second embodiment, the user has some control over the selection of the multiple strategies. In this embodiment, the user manually activates an operating mode in which each campaign is executed using multiple strategies. As long as this mode is active, and only when this mode is active, the penetration testing system selects multiple strategies to use for each executed campaign, as in the first embodiment.

In a third embodiment, the user selects the number of different strategies to be used, for example two different strategies or three different strategies. This may be in addition to the user activating a multiple-strategies mode, as in the second embodiment, or without having such a special mode, as in the first embodiment.

In a fourth embodiment, the user selects which of the pre-defined strategies will be available to the system for selection. As such, in this embodiment the user defines the list of available strategies. This may be in addition to the user activating a multiple-strategies mode, as in the second embodiment, or without having such special mode, as in the first embodiment. Furthermore, this may be in addition to the user selecting the number of different strategies to use, as in the third embodiment, or without the user having such ability, as in the first embodiment.

In an example in which the user has relatively broad control, the user may be presented with an array of multiple check-boxes, each corresponding to one available strategy. If the user selects only one of the check-boxes, this is interpreted to mean only a single campaign should run, and the multiple-strategies mode should be disabled. In such case the single checked strategy is defined by the user and the single campaign to execute will use that strategy. If, however, the user selects multiple check-boxes, which may even be all of the check-boxes, the system removes all unchecked strategies from consideration and selects multiple strategies only from the subset of strategies that were checked by the user. Thus, the user has an option for limiting the automatic selection by the system by eliminating strategies he does not want to be used.

In a fifth embodiment, the user controls which of the pre-defined strategies will be used for running the multiple "almost the same" campaigns. This may be in addition to the user activating a multiple-strategies mode, as in the second embodiment, or without having such special mode, as in the first embodiment. In this embodiment, the user may also select the number of strategies to be used at the time of selecting the strategies to use. Alternatively, the number of strategies to use may be outside the user's control, and the user must select exactly that number of strategies.

In an example in which the user has very broad control, the user may be presented with an array of multiple check-boxes, each corresponding to one available strategy. If the user selects only one of the check-boxes, this is interpreted to mean only a single campaign should run, and the multiple-strategies mode should be disabled. In such case the single checked strategy is defined by the user and the single campaign to execute will use that strategy. If, however, the user checks multiple check-boxes, which may even be all of the available check-boxes, then the checked strategies, and only the checked strategies, will be used by campaigns. Thus, the user defines both the number of strategies to use and which strategies to use.

Figure 3:
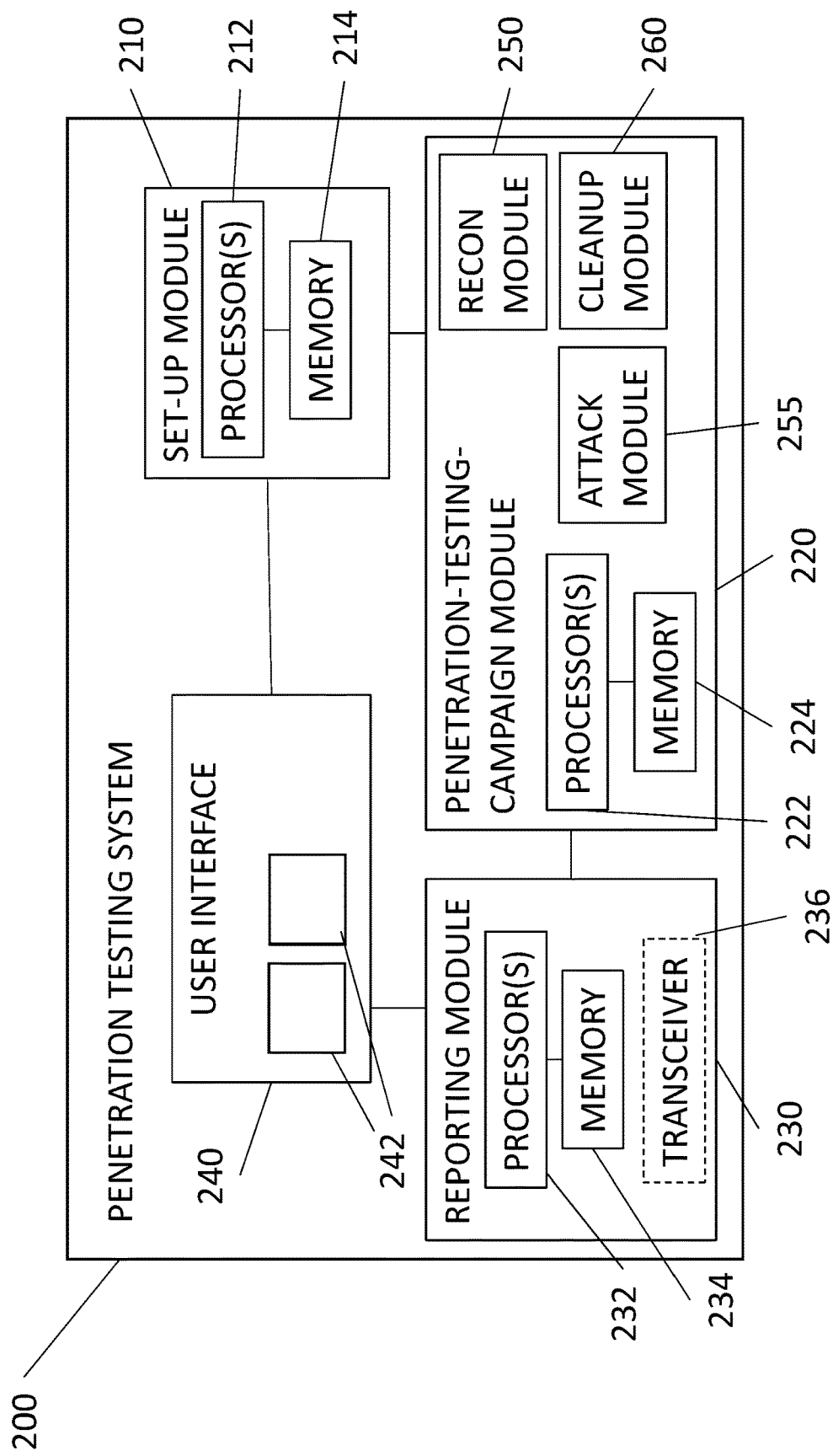
FIG. 3 is a block diagram of a penetration testing system according to an embodiment of the invention.

Reference is now made to FIG. 3, which is a block diagram of a penetration testing system 200 according to an embodiment of the invention.

As seen in FIG. 3, the penetration testing system 200 includes a set-up module 210, adapted for setting up multiple penetration testing campaigns. The set-up module 210 may include one or more set-up processors 212, and a set-up memory 214, such as a non-transitory computer readable storage medium, having stored thereon instructions to be executed by the one or more set-up processors 212. In some embodiments, the set-up memory 214 has stored instructions to select a plurality of lateral movement strategies from a group of two or more lateral movement strategies that are available to be used in penetration testing campaigns.

As explained in further detail hereinbelow, the instructions to select a plurality of lateral movement strategies may include instruction to select all the available lateral movement strategies in the group of available lateral movement strategies, or instructions to select a proper subset of the group of available lateral movement strategies.

System 200 further includes a penetration-testing-campaign module 220, functionally associated with set-up module 210 and including one or more penetration-testing-campaign processors 222 and a penetration-testing-campaign memory 224, such as a non-transitory computer readable storage medium, having stored thereon instructions to be executed by the one or more penetration-testing-campaign processors 222. The memory 224 has stored instructions to execute a plurality of penetration testing campaigns. The number of executed penetration testing campaigns is equal to the number of lateral movement strategies selected by carrying out the instructions stored in memory 214, such that for each specific lateral movement strategy there is a corresponding penetration testing campaign that uses the specific lateral movement strategy as the lateral movement strategy of the attacker. For any two penetration testing campaigns executed according to the instructions stored in memory 224, for any specific information item of penetration testing campaigns other than lateral movement strategy, values of the specific information item in the two penetration testing campaigns are equal.

In some embodiments, the instructions stored in memory 224 are to execute at least two of the plurality of penetration testing campaigns in parallel. This may be particularly useful when the at least two campaigns use simulated penetration testing or reconnaissance agent penetration testing.

In some embodiments, the instructions stored in memory 224 are to execute at least two of the plurality of penetration testing campaigns in series. This may be particularly useful when the at least two campaigns use actual attack penetration testing.

In some embodiments, in which the instructions stored in memory 224 are to execute the plurality of penetration testing campaigns in series, the instructions also specify that the serial execution of the campaigns should be according to an order of the corresponding lateral movement strategies used in the campaigns. The order of the lateral movement strategies may be pre-defined by a vendor of the penetration testing system, or may be randomly determined at the time of executing the campaigns.

In some embodiments, memory 224 further has stored instructions to assign a corresponding time limit to each penetration testing campaign of said plurality of penetration testing campaigns, and in the instructions to execute, execution time of each penetration testing campaign is limited by the corresponding time limit.

In some embodiments, different penetration testing campaigns are assigned different time limits, for example based on a characteristic of the corresponding lateral movement strategies of the campaigns. In other embodiments, the same time limit may be assigned to all the campaigns being executed according to the instructions stored in memory 224.

In some embodiments, the instructions to execute the penetration testing campaigns comprise instructions to execute each of the plurality of penetration testing campaigns to completion. In other embodiments, the instructions to execute the plurality of penetration testing campaigns include instructions to be carried out if it is determined by one (or more) of the penetration testing campaigns that at least one security vulnerability exists in the networked system. According to such instructions, all penetration testing campaigns that are running at the time of determination are aborted, and execution of all penetration testing campaigns of the plurality of penetration testing campaigns scheduled to be executed that have not yet started execution is canceled.

System 200 further includes a reporting module 230, functionally associated with a user interface 240 and with penetration-testing-campaign module 220. Reporting module 230 includes one or more reporting processors 232, and a reporting memory 234, such as a non-transitory computer readable storage medium, having stored thereon instructions to be executed by the one or more reporting processors 232. The reporting memory 234 has stored instructions to report at least one security vulnerability detected or determined to exist in the networked system according to results of one or more of the penetration testing campaigns executed by penetration-testing-campaign module 220. The instructions to report include at least one of:

(i) instructions to cause a display device (e.g. of user interface 240 or another display device, which may be located remotely to the reporting module 230) to display a report containing information about the detected security vulnerability;

(ii) instructions to store the report containing information about the detected security vulnerability in a file; and (iii) instructions to electronically transmit the report containing information about the detected security vulnerability, for example using a transceiver 236 functionally associated with the reporting module 230.

In some embodiments, the instructions stored in memory 214 include instructions to select a plurality of lateral movement strategies automatically, for example based on a value of an information item of the penetration testing campaigns which will use the strategies, or at random.

In some embodiments, the instructions to select a plurality of lateral movement strategies include instructions to select a specific number of lateral movement strategies. In some embodiments, the number may be pre-defined by a vendor of the penetration testing system, and/or may depend on a value of an information item of the campaigns to be executed.

In some embodiments, the set-up module 210 is functionally associated with the user interface 240, and the user interface 240 may include one or more user interface components 242 for manual and explicit definition of the group of lateral movement strategies available for selection by the set-up module 210.

In some embodiments, set-up memory 214 further has stored instructions to receive, via the user interface 240, one or more manually entered inputs. In embodiments, the one or more inputs provide the number of lateral movement strategies to be selected, as described in greater detail hereinbelow with reference to FIG. 6. In some embodiments, the one or more inputs explicitly select the plurality of lateral movement strategies to be used in penetration testing campaigns, as explained in further detail hereinbelow with reference to FIG. 8.

In some embodiments, the set-up memory 214 also has stored instructions to receive one or more manually-entered inputs which instruct the penetration testing system to enter a mode in which selection of a plurality of lateral movement strategies is enabled, as explained hereinbelow with reference to FIG. 5.

In some embodiments, the group of two or more lateral movement strategies that are available for selection is pre-defined, for example by a vendor of the penetration testing system. In other embodiments, the set-up memory 214 also has stored instructions to determine the group of lateral movement strategies that are available to be used in penetration testing campaigns. These instructions are to be carried out before selection of the lateral movement strategies to be used.

In some embodiments, the instructions to determine the group of available lateral movement strategies include instructions to receive, via user interface 240, one or more manually-entered inputs which determine the group of lateral movement strategies available for use in penetration testing campaigns, as described in further detail hereinbelow with respect to FIG. 7.

In some embodiments, the group of available lateral movement strategies are determined based on a value of an information item of the plurality of penetration testing campaigns.

In some embodiments, system 200 further includes a reconnaissance module 250 adapted to carry out a reconnaissance function, an attack module 255 adapted to carry out an attack function, and optionally a cleanup module 260 adapted to carry out a cleanup function as described hereinabove. The penetration-testing-campaign module 220 may include at least part of the reconnaissance module 250 carrying out reconnaissance function code, the attack module 255 carrying out the attack function code, and optionally the cleanup module 260 carrying out cleanup function code.

In some embodiments, the penetration-testing-campaign memory 224, reporting memory 234, and set-up memory 214 are each a dedicated, and separate, memory component or storage medium. In other embodiments, at least two of the penetration-testing-campaign memory 224, reporting memory 234, and set-up memory 214 may be part of the same memory component or storage medium.

In some embodiments, the set-up processor(s) 212, penetration-testing-campaign processor(s) 222, and reporting processor(s) 232 are each dedicated, and separate, processors. In other embodiments, at least two of the set-up processor(s) 212, penetration-testing-campaign processor(s) 222, and reporting processor(s) 232 share at least one common processor.

Figure 4A:
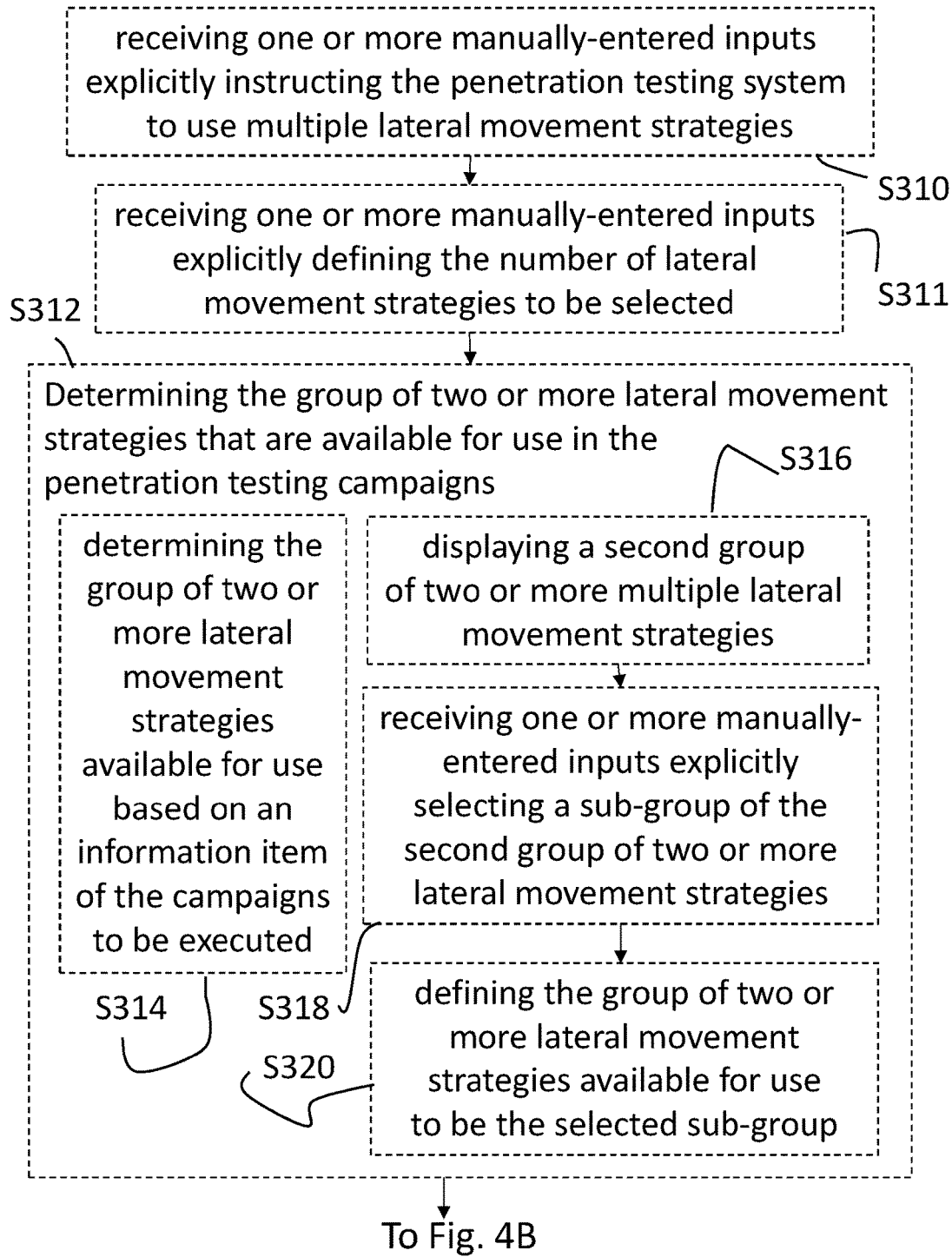
FIGS. 4A, 4B, and 4C together are a flow chart of a method for penetration testing of a networked system according to an embodiment of the invention.
Figure 4B:
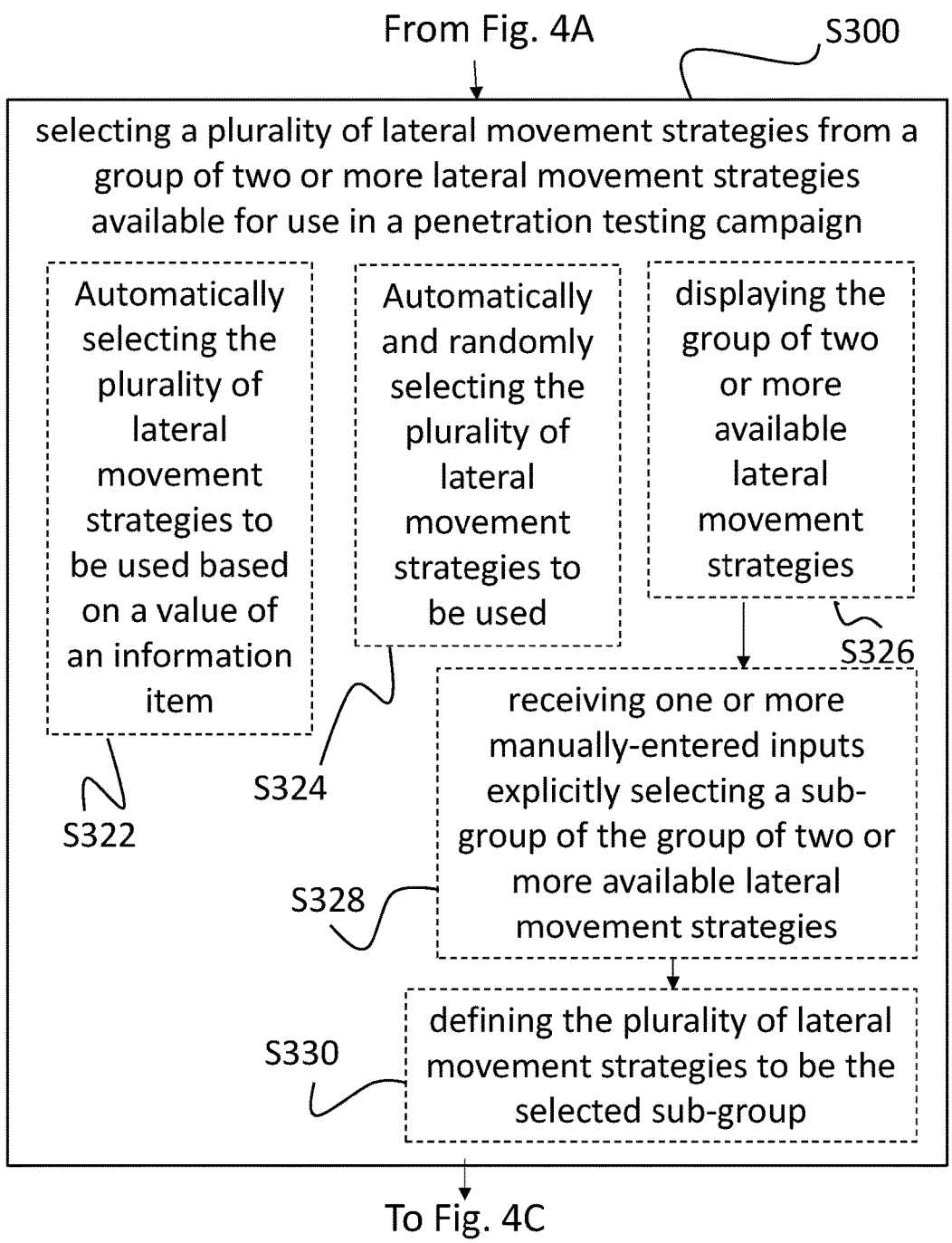
Figure 4C:
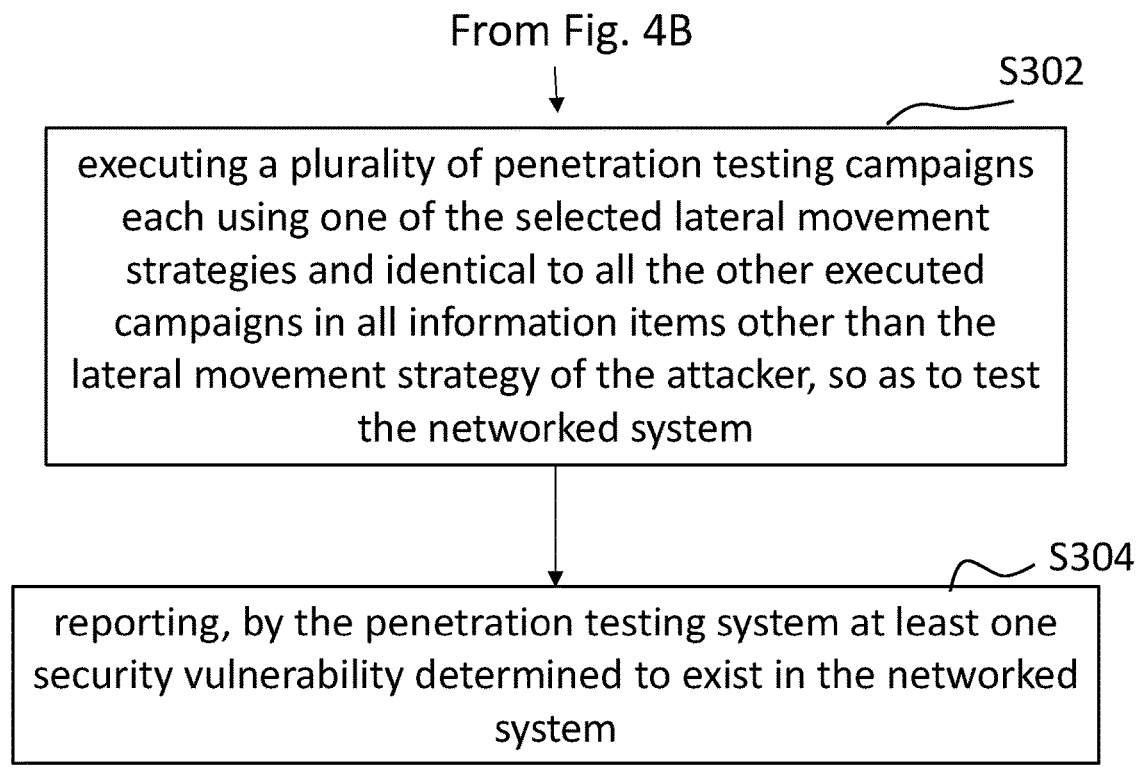

FIGS. 4A, 4B, and 4C, together, are a flow-chart of a method of penetration testing of a networked system by a penetration testing system using a plurality of penetration testing campaigns each employing a different lateral movement strategy.

In step S300 of FIG. 4B, the penetration testing system selects a plurality of lateral movement strategies from a group of two or more lateral movement strategies available for use in penetration testing campaigns. Embodiments of implementation of step S300 are described in further detail hereinbelow.

In some embodiments, the selected plurality of lateral movement strategies may be a proper subset of the group of two or more lateral movement strategies. In other embodiments, the selected lateral movement strategies are all the lateral movement strategies in the group of available lateral movement strategies.

Turning to FIG. 4C, in step S302 a plurality of penetration testing campaigns is executed by the penetration testing system, for example by penetration-testing-campaign module 220 of FIG. 3, so as to test the networked system. The number of penetration testing campaigns executed is equal to the number of selected lateral movement strategies, such that each campaign uses a different one of the selected lateral movement strategies as the lateral movement strategy of the attacker of the corresponding penetration testing campaign. As such, each selected lateral movement strategy is used in a corresponding penetration testing campaign. In all the penetration testing campaigns being executed, the values for all information items of the campaigns other than the lateral movement strategy, are equal. As such, the penetration testing campaigns are "almost the same", with the only distinguishing value being that of the lateral movement strategy.

Execution of each of the penetration testing campaigns includes selecting the next network node to be attacked or to attempt to compromise, according to the corresponding selected lateral movement strategy.

Following termination or completion of the penetration testing campaigns, at step S304 the penetration testing system reports at least one security vulnerability determined to exist in the networked system by the execution of the penetration testing campaigns, for example by reporting module 230 of FIG. 3. The reporting comprises at least one of:
  (i) causing a display device to display a report containing information about the security vulnerability,
  (ii) storing the report containing information about the security vulnerability in a file, and
  (iii) electronically transmitting (e.g. over a computer network) the report containing information about the security vulnerability.

In one example, in which the reporting at step S304 comprises causing a display device to display a report containing information about the security vulnerability, a computing device that performs the reporting causes a local display device (e.g. either residing in a common housing with the computing device that performs the reporting or connected via a local device interface) to display the report.

Alternatively or additionally, information about the security vulnerability may be sent to another computing device (e.g. in communication with the computing device that performs the reporting via a local or remote network) to cause the other computing device to display the report on a display device local to the other computing device or to store it in a storage device for later use.

In some embodiments, the reporting may be in real time or substantially in real time. Alternatively, the reporting may be a delayed reporting where the data is first stored in volatile and/or non-volatile memory of the computing device that performs the reporting, and the reporting step may be completed only after some delay (e.g. even a delay of weeks or months or years).

In some embodiments, a step S310 may precede step S300, as seen in FIG. 4A. In step S310 the penetration testing system receives one or more manually-entered inputs explicitly instructing the penetration testing system to enter a mode in which selection of a plurality of lateral movement strategies and execution of a plurality of corresponding penetration testing campaigns, are enabled. The inputs may be provided by the user via a user interface, such as user interface 240 of FIG. 3. An example of step S310 is described hereinbelow with reference to FIG. 5.

In other embodiments, the system may, by default, select a plurality of lateral movement strategies and run a corresponding plurality of penetration testing campaigns.

In some embodiments, the number of lateral movement strategies selected at step S300 is pre-defined by a vendor of the penetration testing system. In some embodiments, the number of lateral movement strategies selected at step S300 is dependent on a value of an information item of the penetration testing campaigns. For example, for a campaign having a goal of compromising all nodes in the network, the order in which the multiple nodes are accessed may be less significant, and then a smaller number of lateral movement strategies may be selected, whereas when the success of achieving the goal may be greatly affected by the lateral movement strategy, for example when attempting to export a specific file or to compromise a specific node, a greater number of lateral movement strategies may be selected.

As seen in FIG. 4A, in some embodiments, a step S311 may precede step S300, in which the penetration testing system receives one or more manually-entered inputs explicitly defining the number of lateral movement strategies to be selected at step S300. The inputs may be provided by the user via a user interface, such as user interface 240 of FIG. 3. An example of step S311 is described hereinbelow with reference to FIG. 6.

In some embodiments, the group of two or more lateral movement strategies available for selection at step S300 is pre-defined by a vendor of the penetration testing system. This is the default implementation assumed by step S300 in embodiments in which step S312 is not implemented.

However, in other embodiments, the group of two or more lateral movement strategies available for selection by the penetration testing system is determined at step S312, prior to step S300, as seen in FIG. 4A.

In some such embodiments, such determination is carried out by step S314, in which the group of two or more lateral movement strategies available for selection is determined based on a value of an information item of the penetration testing campaigns to be executed. For example, if the goal of the penetration testing campaigns is to retrieve a specific file, available lateral movement strategies may be those that promote, or facilitate, finding a specific file rapidly, without exploring the entire network.

In other embodiments, the determination of the group of two or more lateral movement strategies available for selection is carried out by a user. In such embodiments, in step S316, the penetration testing system displays to the user, for example via user interface 240 of FIG. 3, a second group of two or more lateral movement strategies. Subsequently, in step S318, the penetration testing system receives one or more manually-entered inputs explicitly selecting a sub-group of the second group of two or more lateral movement strategies. For example, the inputs may be provided via user interface 240 of FIG. 3. In step S320 the group of two or more lateral movement strategies from which the plurality of lateral movement strategies are selected in step S300 is defined to be the selected sub-group of the second group of two or more lateral movement strategies.

Specific examples of step S312 are discussed below with reference to FIG. 7.

In some embodiments, the selection of the lateral movement strategies at step S300 may be carried out automatically, by the penetration testing system. In some such embodiments, the lateral movement strategies may be automatically selected based on a value of an information item of the planned campaigns, as illustrated in step S322 of FIG. 4B. For example, if the goal of the campaign is to compromise a specific node, the system would select strategies which are more directional, and can try to reach the specific node more rapidly. By contrast, if the goal is to compromise all the nodes in the system, the selected lateral movement strategies may be ones that ensure the rapidest coverage of all the nodes.

In other embodiments, the selection of the lateral movement strategies at step S300 may be an automatic and random selection, as illustrated in step S324 of FIG. 4B.

However, in yet other embodiments, selection of the lateral movement strategies at step S300 is carried out by a user. In such embodiments, in step S326, the penetration testing system displays to the user, for example via user interface 240 of FIG. 3, the group of two or more lateral movement strategies available for use by the penetration testing system. This may be carried out regardless of the mode in which the group was determined. Subsequently, in step S328, the penetration testing system receives one or more manually-entered inputs explicitly selecting a sub-group of the group of two or more available lateral movement strategies. For example, the inputs may be provided via user interface 240 of FIG. 3. In step S330 the lateral movement strategies in the selected sub-group are defined to be the selected plurality of lateral movement strategies.

Specific examples of implementation of step S300 by steps S326, S328, and S330 are discussed below with reference to FIG. 8.

In some embodiments, step S302 includes executing at least two penetration testing campaigns of the plurality of penetration testing campaigns in parallel. This may be particularly suitable when the at least two penetration testing campaigns use simulated penetration testing or reconnaissance agent penetration testing, as explained hereinabove.

In some embodiments, step S302 includes executing at least two penetration testing campaigns of the plurality of penetration testing campaigns in series. This may be particularly suitable when the at least two penetration testing campaigns use actual attack penetration testing, since serial execution ensures that different campaigns cannot interfere with each other.

In some embodiments in which the penetration testing campaigns are run in series, the penetration testing campaigns are executed according to an order of the corresponding lateral movement strategies. In some embodiments, the order is predefined by a vendor of the penetration testing system. In other embodiments, the order is a random order determined at the time of execution of the campaigns.

In some embodiments, prior to executing the penetration testing campaigns, a corresponding time limit is assigned to each penetration testing campaign, such that the execution time of each penetration testing campaign of the plurality of penetration testing campaigns is limited by the corresponding time limit.

In some embodiments, different time limits are assigned to at least two of the penetration testing campaigns, or to each of the penetration testing campaigns. In other embodiments, the time limit assigned to all of the penetration testing campaigns are the same.

In some embodiments, all the penetration testing campaigns are executed to completion, regardless of any interim results thereof. In other embodiments, following a determination by one or more of the penetration testing campaigns that at least one security vulnerability exists in the networked system, the penetration testing campaigns may be changed. Such changes may include aborting all penetration testing campaigns running at the time of making the determination, and/or cancelling execution of all penetration testing campaigns scheduled to be executed that have not yet started execution.

Figure 5:
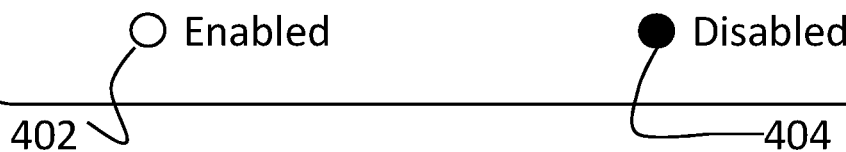
FIG. 5 illustrates a first example of user engagements of a user interface according to a second embodiment of the invention.
Figure 5:
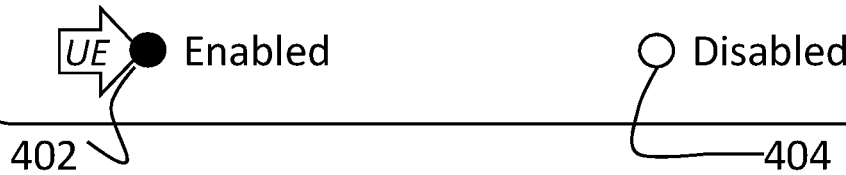
Figure 5:

Reference is now made to FIG. 5, which illustrates an example of user engagements of a user interface for receiving one or more manually-entered inputs explicitly instructing the penetration testing system to enter a mode in which selection of a plurality of lateral movement strategies and execution of a plurality of corresponding penetration testing campaigns, are enabled, as disclosed in step S310 of FIG. 4A.

In the example presented in FIG. 5, a GUI element 400 allows the user to manually and explicitly select between enabling use of multiple lateral movement strategies, and disabling use of multiple lateral movement strategies, in which case a single lateral movement strategy is used. In the embodiment illustrated in FIG. 5, the user may select whether to enable use of multiple lateral movement strategies using a first radio button 402, or to disable such use using a second radio button 404.

FIG. 5 present three frames—Frame 1 at time t1, Frame 2 at time t2, and Frame 3 at time t3. In all frames of FIG. 5, UE is an abbreviation for 'user engagement'—this relates to a user engagement of a GUI element. For example, the user provides a mouse click (e.g. depressing a mouse button) when a mouse pointer is located in a specific location of the GUI element. The skilled artisan will appreciate that a mouse click is just one example of a user engagement of a GUI element or portion thereof. In another example, a mouse-pointer points to an element without any need for a mouse-click; in another example, a user touches with his or her finger (or with a stylus) a GUI element for 'user engagement'.

In Frame 1, no selection has yet been made by the user, and the default value of the system is selected. In the illustrated embodiment, the default value is for disabling use of multiple lateral movement strategies, and as such, in Frame 1, radio button 404 is selected.

In Frame 2, at time t2 the user selects to enable use of multiple lateral movement strategies—e.g. the user engagement of radio button 402 of GUI element 400 may be provided by a mouse-click.

In Frame 3, at time t3 when the user's mouse-pointer is located within a 'Confirm' button 406 of the GUI, the user provides a mouse-click, thereby confirming his selection and facilitating the next step in setting up the penetration testing campaigns and/or triggering of steps S300 to S304 of the method of FIG. 4B.

It is appreciated that, in some embodiments, steps S300 to S304 may begin execution immediately after the user clicking the 'Confirm' button 406, in which case the number of lateral movement strategies selected at step S300, the group of available lateral movement strategies, and the actual selection at step S300 may be automatically selected by the system, as described hereinabove.

In other embodiments, clicking of the 'Confirm' button may trigger steps S311 and/or S312 to be executed prior to execution of steps S300 to S304. In such embodiments, following user interaction with the 'Confirm' button 406, the user may be presented with another GUI element, for example as described herein with respect to FIGS. 6 and 7.

Figure 6:
FIG. 6 illustrates a second example of user engagements of a user interface according to a third embodiment of the invention.

Reference is now made to FIG. 6, which illustrates an example of user engagements of a user interface for receiving one or more manually-entered inputs explicitly providing to the penetration testing system a number of lateral movement strategies to be selected at step S300, as disclosed in step S311 of FIG. 4A.

In the example presented in FIG. 6, a GUI element 450 allows the user to manually and explicitly select the number of lateral movement strategies that will be used by the penetration testing system. In the embodiment illustrated in FIG. 6, the user may enter any desired positive number of lateral movement strategies in a text box 452. In the case that the user enters a number greater than the number of available lateral movement strategies, the system may use all the available lateral movement strategies.

In other embodiments, not illustrated, the user may select the desired number of lateral movement strategies from a suitable list, for example provided as radio buttons or in a drop down menu, so as to ensure that the user does not select a number greater than the number of available lateral movement strategies.

FIG. 6 present three frames—Frame 1 at time t1, Frame 2 at time t2, and Frame 3 at time t3. In all frames of FIG. 6, UE is an abbreviation for 'user engagement'—as described hereinabove with respect to FIG. 5.

In Frame 1, no selection has yet been made by the user, and the default value of the system is selected. In the illustrated embodiment, the default value is for using a single lateral movement strategy, and as such, in Frame 1, the number 1 appears in text box 452. However, in order to demonstrate to the user that this is a default selection and may be changed by the user, the number 1 appears in a different shade or font, here illustrated as a different font from the rest of the user interface, and indicated by italics.

In Frame 2, at time t2 the user selects to use three lateral movement strategies—e.g. the user engagement of text box 452 of GUI element 450 to add the numeral 3 therein may be provided by a keyboard.

In Frame 3, at time t3 when the user's mouse-pointer is located within a 'Confirm' button 456 of the GUI, the user provides a mouse-click, thereby confirming his selection and facilitating the next step in setting up the penetration testing campaigns and/or triggering of steps S300 to S304 of the method of FIG. 4B.

It is appreciated that steps S300 to S304 may begin execution immediately after the user clicking the 'Confirm' button 456, in which case the group of available lateral movement strategies, and the actual selection at step S300 may be automatically selected by the system, as described hereinabove.

In other embodiments, clicking of the 'Confirm' button 456 may trigger step S312 to be executed prior to execution of steps S300 to S304. In such embodiments, following user interaction with the 'Confirm' button 456, the user may be presented with another GUI element, for example as described herein with respect to FIG. 7.

In some embodiments, the user engagement illustrated in FIG. 6 may occur immediately after the user engagement illustrated in FIG. 5. For example, if in FIG. 5 the user clicks radio button 402 indicating that use of multiple lateral movement strategies should be enabled, the user interface may then respond by presenting the user with the text box 452 of FIG. 6, for the user to determine the number of lateral movement strategies to be selected.

Figure 7:
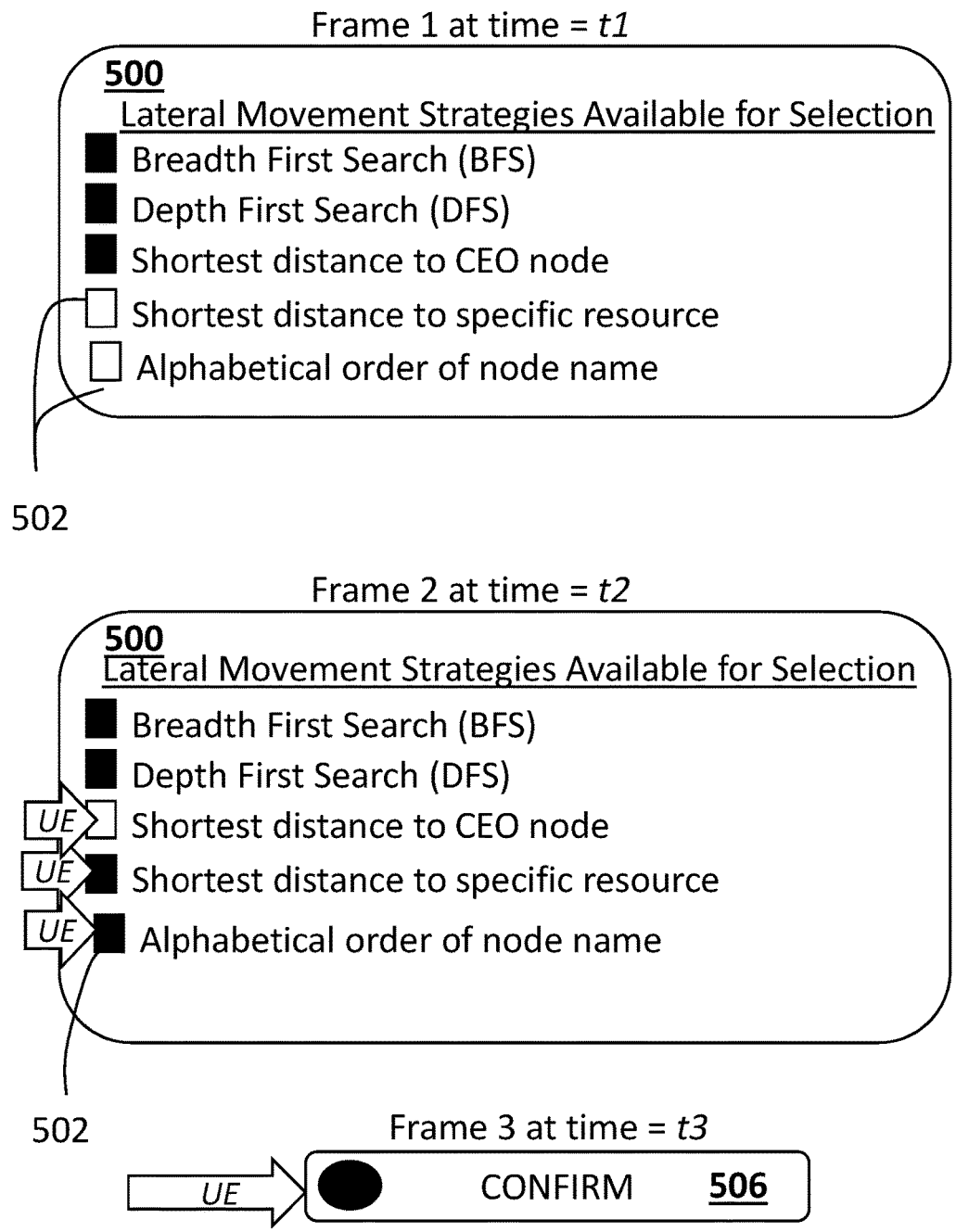
FIG. 7 illustrates a third example of user engagements of a user interface according to a fourth embodiment of the invention.

Reference is now made to FIG. 7, which illustrates an example of user engagements of a user interface for receiving one or more manually-entered inputs explicitly identifying which lateral movement strategies will be available for selection by the penetration testing system in step S300, as disclosed in steps S316-S320 of FIG. 4A.

In the example presented in FIG. 7, a GUI element 500 allows the user to manually and explicitly select lateral movement strategies which will be available for selection by the penetration testing system in step S300. In the embodiment illustrated in FIG. 7, the user may select one or more pre-defined available lateral movement strategies using one or more checkboxes 502.

FIG. 7 present three frames—Frame 1 at time t1, Frame 2 at time t2, and Frame 3 at time t3. In all frames of FIG. 7, UE is an abbreviation for 'user engagement'—as described hereinabove with respect to FIG. 5.

In Frame 1, no selection has yet been made by the user, and the default value of the system is selected. In the illustrated example, it is assumed that the number 3 was selected in the user engagement of FIG. 6. In such a case, the default value may be selection of the first three available lateral movement strategies, and as such, in Frame 1, the checkboxes indicating 'BFS', 'DFS', and 'shortest distance to CEO node' are selected. However, in other embodiments, in which the user engagement of FIG. 7 does not follow the user engagement of FIG. 6, the default selection may be of a single lateral movement strategy.

In Frame 2, at time t2 the user selects specific lateral movement strategies to be available for selection by the penetration testing system (for example when executing step S300 of the method of FIG. 4B)—e.g. the user engagement of checkboxes 502 of GUI element 500 may be provided by mouse-clicks. The user may choose to unselect default selections and add other lateral movement strategies by selecting additional checkboxes. In the illustrated embodiment, the user has kept the default selection of 'BFS' and 'DFS', has unselected the default selection of 'shortest distance to CEO node', and has additionally selected two other lateral movement strategies by user engagement of the checkboxes 502 thereof.

In Frame 3, at time t3 when the user's mouse-pointer is located within a 'Confirm' button 506 of the GUI, the user provides a mouse-click, thereby triggering steps S300 to S304 of the method of FIG. 4B, where the group of lateral movement strategies available for selection by the penetration testing system at step S300 are those whose corresponding check-boxes were selected at time t3.

In some embodiments, the user interface is programmed such that when the user selects more than one lateral movement strategy, use of multiple lateral movement strategies in multiple penetration testing campaigns is automatically enabled. In some such embodiments, selection of multiple lateral movement strategies in Frame 2 may obviate the need for step S310, and may trigger a message notifying the user that use of multiple lateral movement strategies is enabled.

In some embodiments, the user engagement illustrated in FIG. 7 may occur immediately after the user engagement illustrated in FIG. 5 or in FIG. 6. For example, if in FIG. 5 the user clicks radio button 402 indicating that use of multiple lateral movement strategies should be enabled, the user interface may then in response present the user with the list of checkboxes 502 of FIG. 7, for the user to determine the list of lateral movement strategies available for selection.

As another example, if in FIG. 6 the user enters into text box 452 a number greater than 1, in response the user interface may present the user with the list of checkboxes 502 of FIG. 7, for the user to determine the list of lateral movement strategies available for selection. In some such embodiments, the user interface may be programmed such that the user is required to select at least the entered number of lateral movement strategies to be used, in order to facilitate selection by the system of that number of lateral movement strategies. In some such embodiments, Frame 2 may include a message prompting the user to select at least the entered number of lateral movement strategies. In some such embodiments, user engagement with 'Confirm' button 506 may be blocked or prevented, until the user selects a suitable number of lateral movement strategies.

Reference is now made to FIG. 8, which illustrates an example of user engagements of a user interface for receiving one or more manually-entered inputs explicitly selecting the lateral movement strategies to be used, as disclosed in sub-steps S326-S330 of step S300 of FIG. 4B.

In the example presented in FIG. 8, a GUI element 550 allows the user to manually and explicitly select lateral movement strategies which will be used in multiple penetration testing campaigns by the penetration testing system. In the embodiment illustrated in FIG. 8, the user may select one or more of available lateral movement strategies using one or more checkboxes 552. The available lateral movement strategies may be pre-defined, for example by a vendor of the penetration testing system, or may be previously selected by the user, as described hereinabove with respect to FIG. 7. In the illustrated embodiment of FIG. 8, the available lateral movement strategies are those selected by the user engagement of FIG. 7.

FIG. 8 present three frames—Frame 1 at time t1, Frame 2 at time t2, and Frame 3 at time t3. In all frames of FIG. 8, UE is an abbreviation for 'user engagement'—as described hereinabove with respect to FIG. 5.

In Frame 1, no selection has yet been made by the user, and the default value of the system is selected. In the illustrated example, it is assumed that the number 3 was selected in the user engagement of FIG. 6. In such a case, the default value may be selection of the first three available lateral movement strategies, and as such, in Frame 1, the checkboxes indicating 'BFS', 'DFS', and 'shortest distance to specific resource' are selected. However, in other embodiments, in which the user engagement of FIG. 8 does not follow the user engagement of FIG. 5 or of FIG. 6, the default selection may be of a single lateral movement strategy.

In Frame 2, at time t2 the user selects specific lateral movement strategies to be used in penetration testing campaigns by the penetration testing system when executing step S302 of the method of FIG. 4B—e.g. the user engagement of checkboxes 552 of GUI element 550 may be provided by mouse-clicks. The user may choose to unselect one or more default selections, and to add additional lateral movement strategies by selecting additional checkboxes. In the illustrated example, the user has kept the default selection of 'BFS' and 'DFS', has unselected the default selection of 'shortest distance to specific resource', and has additionally selected one other lateral movement strategy by user engagement of the checkbox 552 thereof.

In Frame 3, at time t3 when the user's mouse-pointer is located within a 'Confirm' button 556 of the GUI, the user provides a mouse-click, thereby triggering steps S302 to S304 of the method of FIG. 4B, where the lateral movement strategies selected by the penetration testing system at step S300 are those whose corresponding check-boxes were selected at time t3.

In some embodiments, the user interface is programmed such that when the user selects more than one lateral movement strategy, use of multiple lateral movement strategies in multiple penetration testing campaigns is automatically enabled, and the number of penetration testing campaigns to be executed is automatically determined. In some such embodiments, selection of multiple lateral movement strategies in Frame 2 may obviate the need for steps S310 and/or S311, and may trigger a message notifying the user that multiple lateral movement strategies are being used.

In some embodiments, the user engagement illustrated in FIG. 8 may occur immediately after the user engagements illustrated in FIG. 5, FIG. 6, or FIG. 7. For example, if in FIG. 5 the user clicks radio button 402 indicating that use of multiple lateral movement strategies should be enabled and the group of available lateral movement strategies is pre-defined, then the user interface may then present the user with the list of checkboxes 552 of FIG. 8, for the user to select the lateral movement strategies to be used.

As another example, if in FIG. 6 the user enters into text box 452 a number greater than 1 and the group of available lateral movement strategies is pre-defined, the user interface may then present the user with the list of checkboxes 552 of FIG. 8, for the user to select the lateral movement strategies to be used. In some such embodiments, the user interface may be programmed such that the user is required to select a number of lateral movement strategies entered in text box 452. In some such embodiments, Frame 2 may include a message prompting the user to select the entered number of lateral movement strategies. In some such embodiments, user engagement with 'Confirm' button 556 may be blocked or prevented, until the user selects a suitable number of lateral movement strategies.

As a further example, if in FIG. 7 the user selects specific lateral movement strategies to be available by clicking check boxes 502, the user interface may then present the user only with those checkboxes 502 selected by the user in FIG. 7 as the list of checkboxes 552 of FIG. 8, as seen from comparison of FIGS. 7 and 8 herein.

Definitions

This disclosure should be interpreted according to the definitions below. In case of a contradiction between the definitions in this Definitions section and other sections of this disclosure, this section should prevail.

In case of a contradiction between the definitions in this section and a definition or a description in any other document, including in another document included in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked system has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation".

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode.

Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system.

The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign"—A specific run of a specific test of a specific networked system by the penetration testing system.
19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.
20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.
    An information item of a campaign is either a primary information item of the campaign or a secondary information item of the campaign.
    A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.
    A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.
21. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.
22. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.
23. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.
24. "pre-defined scenario", "pre-defined test scenario", "scenario template" or "template scenario"—A scenario that exists in storage accessible to a penetration testing system before the time a campaign is started, and can be selected by a user of the penetration testing system for defining a campaign of penetration testing. A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.
    A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.
25. "attacker" or "threat actor"—An entity, whether a single person, a group of persons or an organization, that might conduct an attack against a networked system by penetrating it for uncovering its security vulnerabilities and/or for compromising it.

26. "a type of an attacker"—A classification of the attacker that indicates its main incentive in conducting attacks of networked systems. Typical values for a type of an attacker are state-sponsored, opportunistic cyber criminal, organized cyber criminal and insider.
An attacker can have only a single type.

27. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities.
An attacker can have one or multiple capabilities.

28. "a goal of an attacker"—What the attacker of a campaign is trying to achieve when attacking a targeted networked system. In other words, what is the criterion according to which it will be judged whether the attack was a success or a failure and/or to what extent was it a success or a failure. Selecting a type of an attacker may cause a default selection of a goal for that attacker, but the user may have an option to override the default selection. An attacker can have one or multiple goals.

29. "a lateral movement strategy of an attacker"—A decision logic applied by the attacker of a campaign for selecting the next network node to try to compromise. During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly.

It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be comprisable", etc.

A simple example of a lateral movement strategy is a "depth first" strategy. In such strategy, the next network node to try to compromise is an immediate neighbor of the last network node that was compromised that is not yet compromised (provided such neighbor node exists). Two network nodes are "immediate neighbors" of each other if and only if they have a direct communication link between them that does not pass through any other network node.

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource, and picking the first node on this path to be the next node to try to compromise. Note that if the shortest path has a length of one (which happens when the specific node is an immediate neighbor of an already compromised node), then the next node to try to compromise is the specific node containing the desired resource. Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also an immediate neighbor of an already compromised node (if such node exists). Selecting a type of an attacker may cause a default selection of a lateral movement strategy for that attacker, but the user may have an option to override the default selection.

An attacker can only have a single lateral movement strategy.

30. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

31. "penetration testing by actual attack" or "actual attack penetration testing" or "penetration testing by actual exploit" or "actual exploit penetration testing"—Penetration testing in which (i) the functionality of the reconnaissance function is fully implemented by (A)

software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

32. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

33. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

34. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

35. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system. The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

36. "internal data of a network node"—Data related to the network node that is only directly accessible to code executing by a processor of the network node and is only accessible to any code executing outside of the network node by receiving it from code executing by a processor of the network node. Examples of internal data of a network node are data about internal events of the network node, data about internal conditions of the network node, and internal factual data of the network node.

37. "internal event of/in a network node"—An event occurring in the network node whose occurrence is only directly detectable by code executing by a processor of the network node. Examples of an internal event of a network node are an insertion of a USB drive into a port of the network node, and a removal of a USB drive from a port of the network node. An internal event may be a free event or a non-free event.

It should be noted that the term "an event of X" refers to any occurrence of an event of the type X and not to a specific occurrence of it. For referring to a specific occurrence of an event of type X one should explicitly say "an occurrence of event of X". Thus, a software module which looks for detecting insertions of a USB drive into a port is "detecting an event of USB drive insertion", while after that module had detected such event it may report "an occurrence of an event of USB drive insertion".

38. "internal condition of/in a network node"—A Boolean condition related to the network node which can only be directly tested by code executing by a processor of the network node. Examples of an internal condition of a network node are whether the local disk of the terminal node is more than 98% full or not, and whether a USB drive is currently inserted in a port of the network node.

39. "internal factual data of/in a network node" or "internal facts of a network node"—Facts related to the network node which can only be directly found by code executing by a processor of the network node. Examples of factual data of a network node are the version of the firmware of a solid-state drive installed in the network node, the hardware version of a processor of the network node, and the amount of free space in a local disk of the network node.

40. "resource of a networked system"—A file in a network node of the networked system, a folder in a network node of the networked system, credentials of a user of the networked system, a peripheral device of a network node of the networked system, or a peripheral device directly attached to a network of the networked system.

41. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

42. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

43. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

44. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

45. "session-hijacking attack"—a cyber-attack where a valid communication session between two network nodes in a networked system is used by an attacker to gain unauthorized access to information or services in the networked computer system.

46. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

47. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.
48 "administrator of a network node"—Any person that is authorized, among other things, to define or change at least one rule controlling at least one of an access right, a permission, a priority and a configuration in the network node.
49 "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.
50. "remote computing device" or "penetration testing remote computing device" (with respect to a given networked system)—A computing device that executes software implementing part or all of the penetration testing software module that is used for testing the given networked system.
  A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.
  A remote computing device may (i) be a dedicated computing device that is dedicated only to doing penetration testing, or (ii) also implement other functionality not directly related to penetration testing.
  A remote computing device is not limited to be a single physical device with a single processing unit. It may be implemented by multiple separate physical devices packaged in separate packages that may be located at different locations. Each of the separate physical devices may include one or multiple processing units.
  A remote computing device may be (i) a physical computing device, or (ii) a virtual machine running inside a physical computing device on top of a hosting operating system.
51. "explicitly selecting"—Directly and clearly selecting, by a human user, of one option out of multiple options available to the human user, leaving no room for doubt and not relying on making deductions by a computing device.
  Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.
  Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.
52. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.
  An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.
  An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.
53. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device.
  In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

54. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

55. "random selection"—A selection that depends on a random or pseudo-random factor. Different possible outcomes in a random selection do not necessarily have the same probabilities of being selected.

56. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

57. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

58. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method of penetration testing of a networked system by a penetration testing system that is controlled by a user interface of a computing device, the method comprising:
   a. selecting a plurality of lateral movement strategies from a group of two or more lateral movement strategies that are available to be used in penetration testing campaigns;
   b. subsequent to the selecting of the plurality of lateral movement strategies, executing, by the penetration testing system, a plurality of penetration testing campaigns, wherein (i) the number of penetration testing campaigns in the plurality of penetration testing campaigns is equal to the number of lateral movement strategies in the selected plurality of lateral movement strategies, (ii) for each specific lateral movement strategy in the selected plurality of lateral movement strategies there is a corresponding penetration testing campaign in the plurality of penetration testing campaigns that uses the specific lateral movement strategy as the lateral movement strategy of the attacker of the corresponding penetration testing campaign, and (iii) values of all information items, other than lateral movement strategy, are equal in all penetration testing campaigns in the plurality of penetration testing campaigns; and
   c. reporting, by the penetration testing system, at least one security vulnerability determined to exist in the networked system by the executing of the plurality of penetration testing campaigns, wherein the reporting comprises at least one operation selected from the group consisting of: (i) causing a display device to display a report including information about the at least one security vulnerability, (ii) storing the report including information about the at least one security vulnerability in a file, and (iii) electronically transmitting the report including information about the at least one security vulnerability.

2. The method of claim 1, wherein the selecting of the plurality of lateral movement strategies includes selecting all of the lateral movement strategies in the group of two or more lateral movement strategies to be the selected plurality of lateral movement strategies.

3. The method of claim 1, wherein the selecting of the plurality of lateral movement strategies includes selecting only some of the lateral movement strategies in the group of two or more lateral movement strategies to be the selected plurality of lateral movement strategies.

4. The method of claim 1, wherein the selecting of the plurality of lateral movement strategies comprises automatically selecting the plurality of lateral movement strategies from the group of two or more lateral movement strategies, by the penetration testing system.

5. The method of claim 4, wherein the automatically selecting of the plurality of lateral movement strategies is based on a value of an information item of the plurality of penetration testing campaigns.

6. The method of claim 4, wherein the automatically selecting of the plurality of lateral movement strategies is a random selection.

7. The method of claim 1, wherein the selecting of the plurality of lateral movement strategies includes receiving, by the penetration testing system and via the user interface of the computing device, one or more manually-entered inputs, the one or more manually-entered inputs selecting the plurality of lateral movement strategies from the group of two or more lateral movement strategies.

8. The method of claim 1, wherein a number of lateral movement strategies in the selected plurality of lateral movement strategies is pre-defined by a vendor of the penetration testing system.

9. The method of claim 1, wherein a number of lateral movement strategies in the selected plurality of lateral movement strategies depends on a value of an information item of the plurality of penetration testing campaigns.

10. The method of claim 1, wherein the selecting of the plurality of lateral movement strategies includes receiving, by the penetration testing system and via the user interface of the computing device, one or more manually-entered inputs, the one or more manually-entered inputs defining a number of lateral movement strategies in the selected plurality of lateral movement strategies.

11. The method of claim 1, further comprising, prior to the selecting, determining, by the penetration testing system, the group of two or more lateral movement strategies that are available to be used in penetration testing campaigns.

12. The method of claim 11, wherein the determining of the group of two or more lateral movement strategies that are available to be used in penetration testing campaigns is based on a value of an information item of the plurality of penetration testing campaigns.

13. The method of claim 1, wherein the executing of the plurality of penetration testing campaigns includes executing at least two penetration testing campaigns of the plurality of penetration testing campaigns in parallel.

14. The method of claim 1, wherein the executing of the plurality of penetration testing campaigns includes executing at least two penetration testing campaigns of the plurality of penetration testing campaigns in series.

15. The method of claim 14, wherein the at least two penetration testing campaigns executed in series are executed according to an order of the corresponding lateral movement strategies, wherein the order of the lateral movement strategies is pre-defined by a vendor of the penetration testing system.

16. The method of claim 14, wherein the at least two penetration testing campaigns executed in series are executed according to a random order determined at the time of the executing.

17. The method of claim 1, wherein said executing the plurality of penetration testing campaigns comprises assigning a corresponding time limit to each penetration testing campaign of said plurality of penetration testing campaigns, wherein execution time of each penetration testing campaign of the plurality of penetration testing campaigns is limited by the corresponding time limit.

18. The method of claim 17, wherein the plurality of penetration testing campaigns includes a first penetration testing campaign and a second penetration testing campaign, wherein the time limit assigned to the first penetration testing campaign is different from the time limit assigned to the second penetration testing campaign.

19. The method of claim 1, wherein the executing of the plurality of penetration testing campaigns comprises: in response to determining, by one penetration testing campaign of the plurality of penetration testing campaigns, that at least one security vulnerability exists in the networked system, (i) aborting all penetration testing campaigns of the plurality of penetration testing campaigns that are running at the time of the determining, and (ii) cancelling execution of all penetration testing campaigns of the plurality of penetration testing campaigns scheduled to be executed that have not yet started execution at the time of determining.

20. A penetration testing system for penetration testing of a networked system, the penetration testing system comprising:
   a. a set-up module including:
      i. one or more set-up processors; and
      ii. a set-up non-transitory computer readable storage medium for instructions execution by the one or more set-up processors, the set-up non-transitory computer readable storage medium having stored instructions to select a plurality of lateral movement strategies from a group of two or more lateral movement strategies that are available to be used in penetration testing campaigns;
   b. a penetration-testing-campaign module including:
      i. one or more penetration-testing-campaign processors; and
      ii. a penetration-testing-campaign non-transitory computer readable storage medium for instructions execution by the one or more penetration-testing-campaign processors, the penetration-testing-campaign non-transitory computer readable storage medium having stored instructions, to be executed subsequent to execution of the instructions to select a plurality of lateral movement strategies by the one or more set-up processors, to execute a plurality of penetration testing campaigns, wherein (i) the number of penetration testing campaigns in the plurality of penetration testing campaigns is equal to the number of lateral movement strategies in the selected plurality of lateral movement strategies, (ii) for each specific lateral movement strategy in the selected plurality of lateral movement strategies there is a corresponding penetration testing campaign in the plurality of penetration testing campaigns that uses the specific lateral movement strategy as the lateral movement strategy of the attacker of the corresponding penetration testing campaign, an (iii) values of all information items, other than lateral movement strategy, are equal in all penetration testing campaigns in the plurality of penetration testing; and
   c. a reporting module, including:
      i. one or more reporting processors; and
      ii. a reporting non-transitory computer readable storage medium for instructions execution by the one or more reporting processors, the reporting non-transitory computer readable storage medium having stored instructions to report at least one security vulnerability determined to exist in the networked system according to results of the plurality of penetration testing campaigns executed by the penetration testing campaign module, the instructions to report including at least one member selected from the group consisting of: (i) instructions to cause a display device to display a report including information about the at least one security vulnerability, (ii) instructions to store the report including information about the at least one security vulnerability in a file, and (iii) instructions to electronically transmit the report including information about the at least one security vulnerability.

* * * * *

UNITED STATES PATENT AND TRADEMARK OFFICE
CERTIFICATE OF CORRECTION

PATENT NO.        : 10,447,721 B2
APPLICATION NO.   : 15/993453
DATED             : October 15, 2019
INVENTOR(S)       : Menahem Lasser Page 1 of 1

It is certified that error appears in the above-identified patent and that said Letters Patent is hereby corrected as shown below:

In the Claims

Column 44 Line 11, Claim 19:
Delete the phrase "time of determining." and replace with --time of the determining.--

Column 44 Line 48, Claim 20:
Delete the phrase "campaign, an (iii) values" and replace with --campaign, and (iii) values--

Column 44 Line 51, Claim 20:
Delete the phrase "penetration testing; and" and replace with --penetration testing campaigns; and--

Signed and Sealed this
Twenty-fourth Day of December, 2019

Andrei Iancu
*Director of the United States Patent and Trademark Office*